US010706587B1

(12) United States Patent
Sorgi et al.

(10) Patent No.: US 10,706,587 B1
(45) Date of Patent: Jul. 7, 2020

(54) CALIBRATION OF MULTIPLE CAMERAS

(71) Applicant: AMAZON TECHNOLOGIES, INC., Seattle, WA (US)

(72) Inventors: Lorenzo Sorgi, Seattle, WA (US); Pramod Sreenivasa, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 16/141,814

(22) Filed: Sep. 25, 2018

(51) Int. Cl.
G06T 7/80 (2017.01)
H04N 7/18 (2006.01)

(52) U.S. Cl.
CPC .............. *G06T 7/80* (2017.01); *H04N 7/181* (2013.01); *G06T 2207/30244* (2013.01)

(58) Field of Classification Search
CPC ...................................................... H04N 7/181
See application file for complete search history.

(56) References Cited

U.S. PATENT DOCUMENTS

| 7,225,980 | B2 | 6/2007 | Ku et al. |
| 7,949,568 | B2 | 5/2011 | Fano et al. |
| 8,009,864 | B2 | 8/2011 | Linaker et al. |
| 8,189,855 | B2 | 5/2012 | Opalach et al. |
| 8,630,924 | B2 | 1/2014 | Groenevelt et al. |
| 9,235,928 | B2 | 1/2016 | Medioni et al. |
| 9,473,747 | B2 | 10/2016 | Kobres et al. |
| 2011/0011936 | A1 | 1/2011 | Morandi et al. |
| 2012/0284132 | A1 | 11/2012 | Kim et al. |
| 2013/0284806 | A1 | 10/2013 | Margalit |
| 2015/0086107 | A1 | 3/2015 | Dedeoglu et al. |
| 2018/0189601 | A1* | 7/2018 | Dabeer ................. G01C 21/30 |
| 2019/0180121 | A1* | 6/2019 | Walter ............... G06K 9/00805 |

OTHER PUBLICATIONS

Asthana, et al., "An Indoor Wireless System for Personalized Shopping Assistance" CiteSeerX, In Proceedings of IEEE Workshop on Mobile Computing Systems and Applications, 1994, 6 pages. Retrieved from the Internet: <http://citeseerx.ist.psu.edu/viewdoc/summary?doi=10.1.1.127.3033&rank=1>.

(Continued)

*Primary Examiner* — Edward Park
(74) *Attorney, Agent, or Firm* — Lindauer Law, PLLC

(57) ABSTRACT

A plurality of cameras obtain images in an environment. Calibration data about the translation and rotation of the cameras is used to support functionality such as determining a location of an object that appears in those images. To determine the calibration data, images are processed to determine features produced by points in the environment. A cluster is designated that includes the images of the same point as viewed from at least some of the cameras. A triangulation matrix and back-projection error are calculated for each cluster. These triangulation matrices and back-projection errors are then perturbed to find the translation and rotation that minimize eigenvalues and eigenvectors representative of the feature. The eigenvalues and eigenvectors are then used to determine the rotation and translation of the respective cameras with respect to an origin.

20 Claims, 7 Drawing Sheets

(56) References Cited

OTHER PUBLICATIONS

Hartley, et al., "Multiple View Geometry in Computer Vision", Second Edition, Cambridge University Press, Apr. 2004, 673 pages. Retrieved from the Internet: <http://cvrs.whu.edu.cn/downloads/ebooks/Multiple%20View%20Geometry%20in%20Computer%20Vision%20(Second%20Edition).pdf>.

Kalnikaite, et al., "How to Nudge In Situ: Designing Lambent Devices to Deliver Information Salience in Supermarkets", ACM, In proceeding of: UbiComp 2011:Ubiquitous Computing, 13th International Conference, UbiComp 2011, Beijing, China, Sep. 17-21, 2011, 10 pages. Retrieved from the Internet: <http://www.researchgate.net/publication/221568350_How_to_nudge_in_Situ_designing_lambent_devices_to_deliver_salient_information_in_supermarkets>.

Kanatani, Kenichi, "Calibration of Ultra-Wide Fisheye Lens Cameras by Eigenvalue Minimization", IEEE Transactions of Pattern Analysis and Machine Intelligence, vol. 35, No. 4, Apr. 2013, 10 pages. Retrieved from the Internet: <http://www.iim.cs.tut.ac.jp/~kanatani/papers/pamifisheye3.pdf>.

Kanatani, Kenichi, "Statistical Optimization for Geometric Computation: Theory and Practice", Elsevier Science Inc., New York, NY, USA, Jan. 1996, 508 pages. Retrieved from the Internet: <http://pdf.to/bookinfo/statistical-optimization-for-geometiric-computation-theory-and-practice.pdf/>.

Pop, Cristian, "Introduction to the BodyCom Technology", AN1391, DS01391A, Microchip Technology, Inc., May 2, 2011, 26 pages.

Triggs, et al., "Bundle Adjustment—A Modern Synthesis", In Proceedings of the International Workshop on Vision Algorithms: Theory and Practice, Corfu, Greece, Sep. 2000, Springer-Verlag, 1883, pp. 298-372. Retrieved from the Internet: <http://www.cs.jhu.edu/~misha/ReadingSeminar/Papers/Triggs00.pdf>.

Vu, et al., "Distinguishing Users with Capacitive Touch Communication", WINLAB, Rutgers University, in proceedings of: The 18th Annual International Conference on Mobile Computing and Networking ('MobiCom '12), Istanbul, Turkey, Aug. 22-26, 2012, 12 pages.

\* cited by examiner

CALIBRATION OF MULTIPLE CAMERAS

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas, such as in a shopping area, and customers can pick items from inventory and take them to a cashier for purchase, rental, and so forth.

Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory within the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
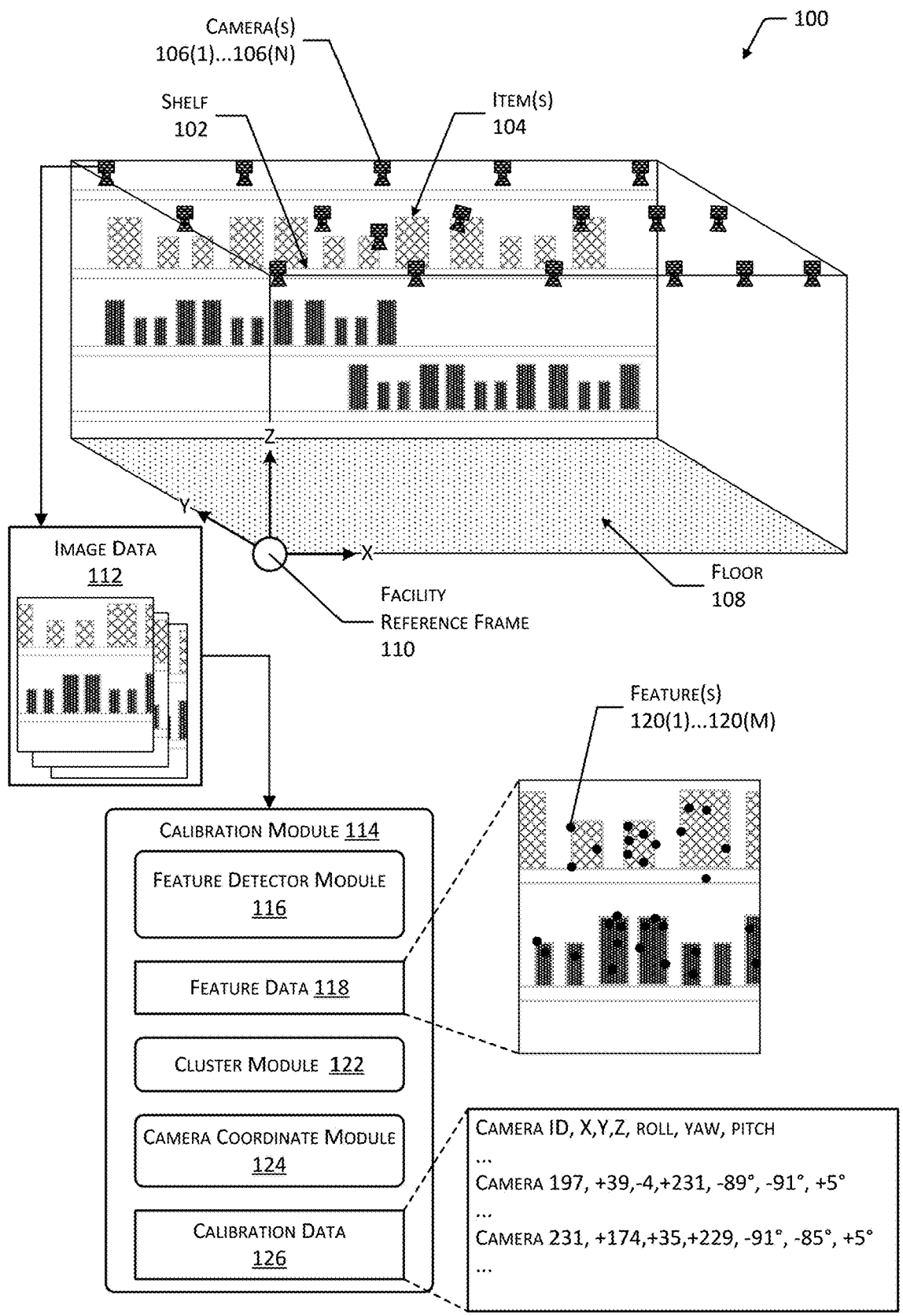
FIG. 1 illustrates a system that generates calibration data for a plurality of cameras in an environment, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A materials handling facility (facility) or other setting may utilize a plurality of cameras to acquire image data comprising images of activities within the facility. These activities may include picking items from inventory locations, such as shelves, or placing items to the inventory locations. Other activities may include users, equipment, and so forth moving around within the facility.

The image data may be processed to provide various information. For example, an item that is being picked or placed may be identified based at least in part on the appearance of the item in the image. In another example, a location of a user who picked the item may be determined, and the pick of the item may be associated with the user. In other examples, the image data may be used to determine other information.

The facility may have a defined facility reference frame, that may be used to specify a location within the facility with respect to one or more designated axes. The location of an object in the facility may be expressed with respect to this facility reference frame. For example, the location of a cart may be specified as +3.15 meters along an x axis and 7.34 meters along a y axis. Information about the location of an object may be used in various ways. For example, if a location of a user is within a threshold distance of an item that is being picked from an inventory location, the user may be determined to have picked the item.

When using the image data to determine the location of an object with respect to the facility, it is necessary to have calibration data that provides information about the cameras that acquired the image data. This calibration data provides information about the translation and rotation of each of the cameras used to locate the item. The translation specifies the position of the camera, such as in three-dimensional (3D) coordinates with respect to a reference frame, such as the facility reference frame. The rotation specifies the rotation, with respect to one or more axes, of the camera with respect to the facility reference frame.

Once the calibration data describing the translation and the rotation of a particular camera is known, it is possible to determine a location of an object depicted in the image data obtained by that camera. A position of a depiction of an object in the two-dimensional image data from the camera may be related to a particular location in the facility. This allows a two-dimensional location of the object to be determined using the image data. If the object is within view of several cameras and different locations, the location of the object may be determined in three dimensions.

Traditionally the determination of the calibration data has been very labor intensive and prone to error. One technique to produce calibration data may use pre-defined and known calibration targets that are placed at particular locations. However, this requires the presence and placement of those calibration targets and may involve subsequent labor to reposition those targets and acquire and process the subsequent data. Another technique to generate calibration data involves placement of cameras on a rigid frame at predetermined locations in predetermined poses. However, this technique does not account for variations such as improper assembly or a change in rotation due to a loose fastener. Use of a rigid frame may also prevent the orientation of cameras during installation to provide a field of view of some portion of the facility that is of interest. For example, it may be desirable to rotate a camera such that a particular portion of a shelf is in the field of view of that camera.

The problem of generating the calibration data becomes considerable as the number of cameras within the facility increases. For example, a facility that includes thousands of cameras may incur substantial time and financial costs to determine calibration data using traditional techniques. Incomplete or incorrect calibration data can result in incorrect data being produced. For example, if the calibration data indicates an incorrect translation of a camera, a location of an object that is depicted in the image data obtained by that camera may be incorrect. Continuing the example, such incorrect data could result in failure of the system to operate as intended.

Described in this disclosure are techniques that allow a system that has a plurality of cameras to determine calibration data without the need for prior knowledge of the geometry of the environment, without the need for known calibration targets, and without human intervention. The resulting calibration data provides information about the translation and rotation of individual cameras within the plurality of cameras. The calibration data may be described with respect to a particular one of the plurality cameras, or with respect to a facility reference frame. The techniques described in this disclosure are also computationally efficient, allowing for the system to readily scale to large numbers of cameras.

The system obtains image data comprising images acquired by a plurality of cameras. These images may be of various parts of the facility. The images are processed to determine one or more features that are present within them. For example, the images may be processed with a scale-invariant feature transform (SIFT) algorithm to determine data that is descriptive of features in the image. In other implementations other techniques may be used to determine the features. These features are not known in advance. For example, the features may be representative of a portion of an item on a shelf, a streak on the floor, an imperfection in the surface of a wall, and so forth. Each feature is at a point M in the three-dimensional space of the environment.

The image data is processed to determine clusters of data obtained from images obtained from different cameras that are representative of a same three-dimensional (3D) point. Each cluster may thus comprise data about a single 3D point as represented by the respective feature as it appears in a plurality of images obtained from a plurality of cameras that are observing that single 3D point. For example, the features of the 3D point as depicted in the images may be described using one or more values in a feature vector space. If a first image comprises a first feature with a first location in the feature vector space that is within a threshold distance of a second feature with a second location that is depicted in a second image, then the first image and the second image may be determined to be within the same cluster.

The cluster comprises information about features that are deemed to represent the same 3D point as obtained from a subset of images that are associated with a particular subset of the plurality of cameras. For example, an image in the image data is acquired by a particular one of the plurality of cameras. Data about the features that represent the same 3D point in space as depicted in a plurality of images obtained from different cameras is used to determine a triangulation matrix. The triangulation matrix represents a translation and rotation of the camera with respect to the 3D point.

A triangulation cost is determined for each cluster using the triangulation matrix by calculating a sum of minimum eigenvalues for the triangulation matrix. Likewise a back-projection error is also calculated for each feature in each cluster. The back-projection error describes a distance on a normalized plane, with respect to the camera, between a particular feature and a projection of the particular feature onto the normalized plane.

The system determines the calibration data of the individual cameras for which images are processed by finding the translation and rotation that results in a minimum of an overall triangulation score. The overall triangulation score is determined by summing the triangulation cost for each cluster and the back-projection error for each feature in each cluster. For example, when the triangulation cost for a particular camera is minimized with respect to the feature, the triangulation matrix may be determined to provide a direct linear transform between axes of the camera and the location of the feature. Continuing the example, the minimization of the back-projection error accounts for the difference between where the image of the feature on the image sensor of the camera actually appears and where it would appear under ideal conditions. The system takes advantage of the fact that a given feature is present in images acquired by at least a subset of the plurality of different cameras at different translations and orientations. These features are fixed in space, at least during the acquisition of images used to generate the calibration data. In some implementations, if the image data is obtained at the same time, or within a threshold window of time, the features associated with moving objects in the environment may be used.

By observing a plurality of 3D points which are visible as features in images obtained in common with a subset of the plurality of cameras, the translation and rotation of the cameras in the subset may be determined, even if the location of the 3D point that the feature represents is not known. A camera may observe several features each corresponding to a different 3D point, allowing that camera to be a member of several different subsets. The various subsets thus are interconnected with respect to one another, allowing for the determination of the translation and rotation of the cameras that provide images to the system.

The system described herein allows for a significant advantage over traditional systems as the calibration data does not rely on prior knowledge of the location of 3D points, and their associated features to operate and also performs fewer calculations to determine the calibration data. For example, a traditional system may use a feature that is provided by a 3D point with a known location to establish a pose of a camera with respect to that 3D point, requiring prior knowledge. In another example, such techniques may require extensive calculations to determine coordinates of 3D points and subsequently use of these coordinates to determine the calibration data. A resulting point cloud of these coordinates would then be used to find a location and orientation of the cameras with respect to the (now known) location of some of the features that represent 3D points. However, the number of 3D points may number in the millions, requiring substantial usage of storage and compute resources. In comparison, the system uses a homogenous linear system formed from the triangulation matrices for a common feature as a common solution, avoiding the need of calculate and use the coordinates of the 3D points. As a result, the system uses significantly less memory and computer resources to generate the calibration data, which may in turn result in reduced time to generate the calibration data.

By using the techniques and systems described herein, calibration data that describes a translation and rotation for a plurality of cameras in an environment may be quickly determined and done without manual intervention. Once available, the calibration data may be used during operation of the facility. By providing the calibration data more quickly and accurately, the facility may be set up in less time and subsequently the calibration data may be regenerated more easily at a later time. For example, once a day image data may be acquired and processed to determine second calibration data. The second calibration data may then be compared with the original calibration data to determine if there have been any changes, for processing the image data to determine the location of an object, and so forth.

FIG. 1 illustrates a system 100 that generates calibration data for a plurality of cameras in an environment, according to some implementations. A portion of an environment in a facility is shown. Within the environment may be inventory locations such as shelves 102 that may hold one or more items 104. A plurality of cameras 106(1), 106(2), ..., 106(N) are present in the environment. The cameras 106 may be positioned overhead, as illustrated here, may be mounted on the shelves 102, may be mounted to walls, and so forth. A floor 108 of the environment is also shown. The floor 108 may have one or more visible features such as patterns, grout lines, seams, and so forth. A camera 106 may have a field of view (FOV) that includes at least a portion of one or more of a wall, a shelf 102, the floor 108, and so forth.

A facility reference frame 110 may be specified, that describes one or more axes. The facility reference frame 110 may be used to describe a location within the environment. For example, the facility reference frame 110 may be designated with respect to an origin and have three mutually orthogonal axes X, Y, and Z. A location within the environment may be described as having coordinates with respect to these axes.

The cameras 106 produce image data 112. For example, each of the cameras 106 may produce image data 112 comprising one or more images that depict the portion of the environment that is within their respected FOV. Each image is associated with the camera 106 that acquired that image. For example, the image data 112 may comprise metadata that includes a camera identifier (ID), timestamp as to when the image was obtained, and so forth.

A calibration module 114 receives as input the image data 112. A feature detector module 116 generates feature data 118 indicative of one or more features 120(1), 120(2), ..., 120(M) that are depicted in the image data 112. A feature 120 corresponds to a three dimensional (3D) point. For example, the feature 120 may be produced by a 3D point on the floor 108, on a shelf 102, and so forth. In one implementation the feature detector module 116 may utilize a scale-invariant feature transform (SIFT) algorithm such as described by David Lowe to determine data that is descriptive of features 120 in the image. In other implementations other techniques may be used to determine the features 120. For example, a gradient location and orientation histogram (GLOH) algorithm or histogram of oriented gradients (HOG) algorithm may be used to detect and describe features 120. In some implementations a neural network may be used to process the image and detect and describe the feature 120.

The feature data 118 may describe a feature 120 as one or more vectors in a feature vector space. For example, the feature vector space may include various dimensions such as x, y, brightness, gradient, red, green, blue, and so forth. The feature data 118 may provide information such as the position within the image at which the particular feature 120 appears. For example, the feature data 118 may indicate that, for a first image, a feature 120 with a first feature vector value is present in a rectangle bounded by corners at row 38, column 17 and row 72, column 27.

The features 120 detected by the feature detector module 116 represent 3D points that are not known in advance. For example, the 3D points that produce the features 120 may be a portion of an item 104 on a shelf 102, a streak on the floor 108, an imperfection in the surface of a wall, and so forth. In some implementations the features 120 may not be visible, or perceptible, to a human eye. For example, the cameras 106 may obtain images using infrared wavelengths. The features 120 are implicit in the environment rather than being explicitly created and placed in the environment, such as with a calibration target.

A cluster module 122 determines clusters of features that correspond to what is determined to be the same three-dimensional (3D) point in the environment. Images that contain these corresponding features may comprise a subset of the images as obtained by different cameras 106. For example, the cluster module 122 may compare the feature data 118 and find those features 120 that are determined to be the same. Continuing the example, a first feature 120(10) in a first image and a second feature 120(11) in a second image may be determined to be the same if their respective feature vectors are within a threshold distance of one another in feature vector space. In another implementation, a difference may be calculated between a first feature vector of the first feature 120(10) and a second feature vector of the second feature 120(11). If the difference is less than a threshold value, the first feature 120(10) and the second feature 120(11) may be deemed to be representative of the same 3D point. In other implementations, other techniques may be used to determine the correspondence between images.

A camera coordinate module 124 is configured to determine calibration data 126. The calibration data 126 may include one or more of a camera ID, translation values along one or more axes, or rotation values with respect to the one or more axes. For example, the calibration data 126 may indicate the translation values as 3D coordinates for a particular camera 106, and the rotation of that camera 106 with respect to three axes. In some implementations the calibration data 126 may be given with respect to the facility reference frame 110. For example, the camera coordinate module 124 may generate calibration data 126 that is defined with respect to a designated camera 106(1). In some implementations the calibration data 126 may be provided with respect to the facility reference frame 110. Continuing the earlier example, the translation and rotation of the designated camera 106(1) with respect to the facility reference frame 110 may be determined, such as by manual measurement or detection of one or more features 120. A transformation matrix may be determined that relates the translation and rotation of the designated camera 106(1) to the facility reference frame 110. The transformation matrix may then be used to process the translation and rotation data from the individual cameras 106(2), ..., 106(N) such that the resulting calibration data 126 indicates the translation and rotation of the individual cameras 106(2), ..., 106(N) with respect to the facility reference frame 110.

Operation of the calibration module 114 to determine the calibration data 126 is described in more detail below with regard to FIG. 3. The calibration data 126 may be subsequently used to process image data 112. For example, with the calibration data 126, an apparent position of an object depicted in the image data 112 of images from a plurality of cameras 106 may be used to determine a location in 3D space, such as with respect to the facility reference frame 110, of the object.

Figure 2A:
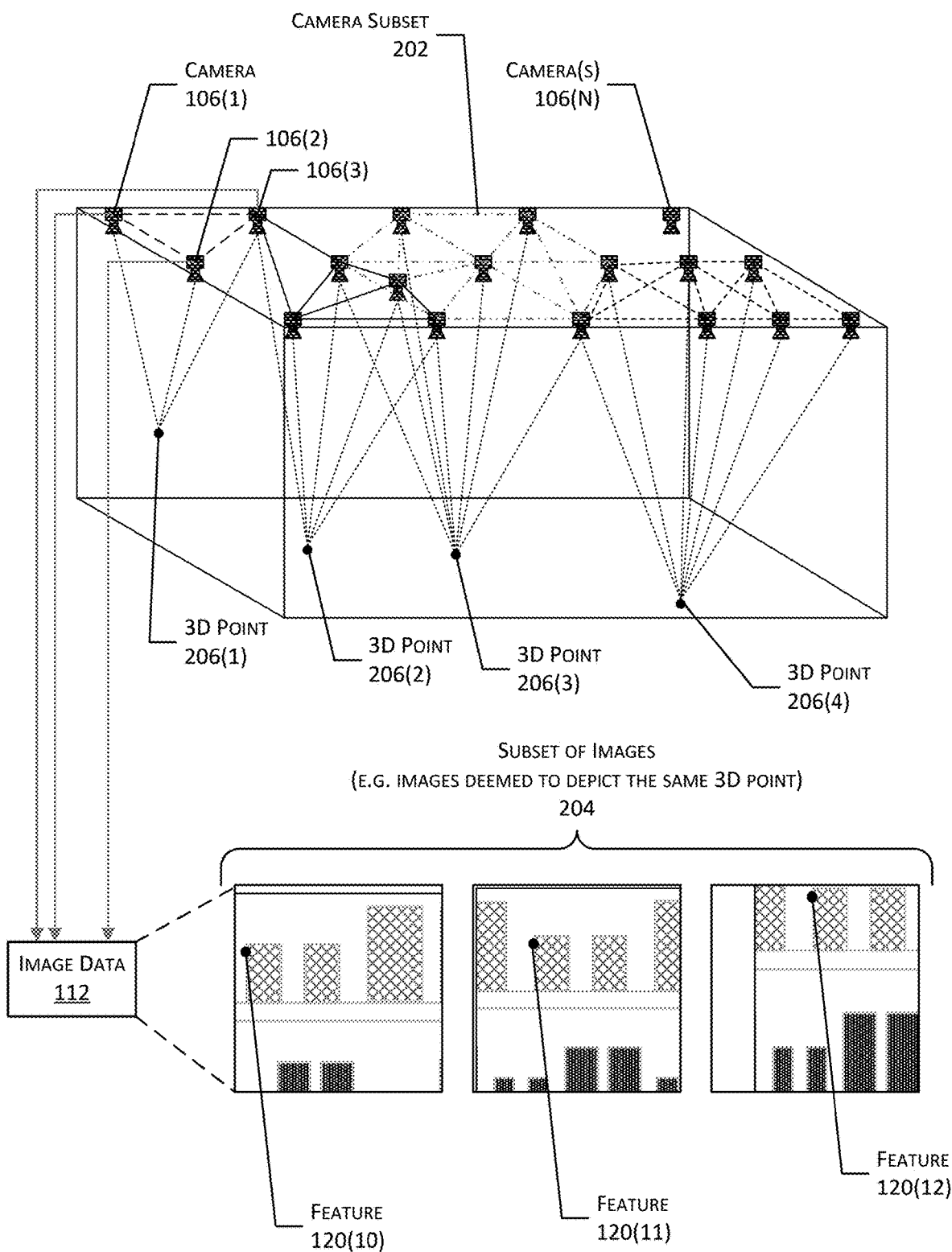
FIG. 2A illustrates a portion of the environment with a plurality of cameras and subsets of images from those cameras that are deemed to depict the same feature, according to some implementations.

FIG. 2A illustrates at 200 a portion of the environment with a plurality of cameras 106 and subsets of images from those cameras 106 that are deemed to depict the same feature 120, according to some implementations.

In this illustration, four 3D points 206(1)-(4) are depicted. For example, the 3D point 206 may comprise a point on an item 104, an inventory location, a wall, a floor 108, and so forth. In this illustration, 3D point 206(1) corresponds to a part of an item 104 on a shelf 102. Four 3D points 206 are shown by way of illustration, and not as a limitation. For example, the environment may include millions of 3D points 206. 3D points 206 may produce a feature 102 in an image obtained by a camera 106.

Camera subsets 202 are shown, by way of lines connecting cameras 106, that have acquired image data 112 of the same 3D point 206 as determined by the cluster module 122. For example, a first camera subset 202(1) includes the three cameras 106(1), 106(2), and 106(3) that produce image data 112 comprising a subset of images 204 that have features 120(10)-120(12) that depict the same 3D point 206(1) from different points of view. Because of the different translation and rotation of the cameras 106(1)-(3), each of the images in the subset of images 204 has the feature 120 located at a different row and column within the particular image.

Other camera subsets 202 are shown, including cameras 106 that are associated with one another because they have respective FOVs and resulting images that include what has been determined to be the same feature 120. Each of these camera subsets 202 may produce their own respective subset of images 204.

A camera 106 may acquire images that include many 3D points 206 and their corresponding features 120. As a result, a single camera 106 may be a member of several different camera subsets 202. For example, camera 106(3) is a member of two different camera subsets 202.

Figure 2B:
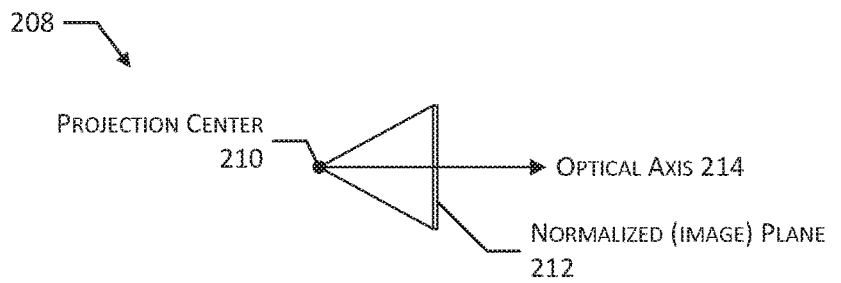
FIG. 2B illustrates back-projection error, according to some implementations.
Figure 2B:
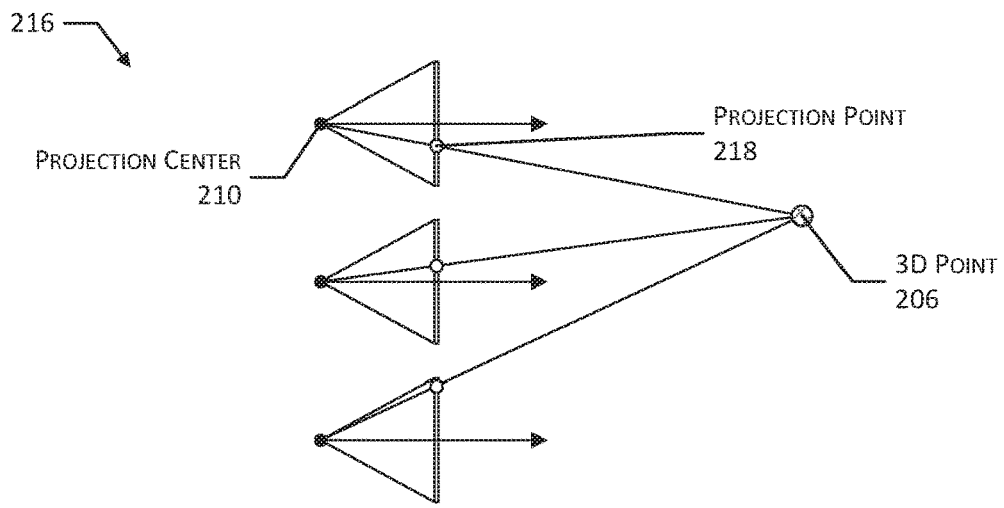
Figure 2B:
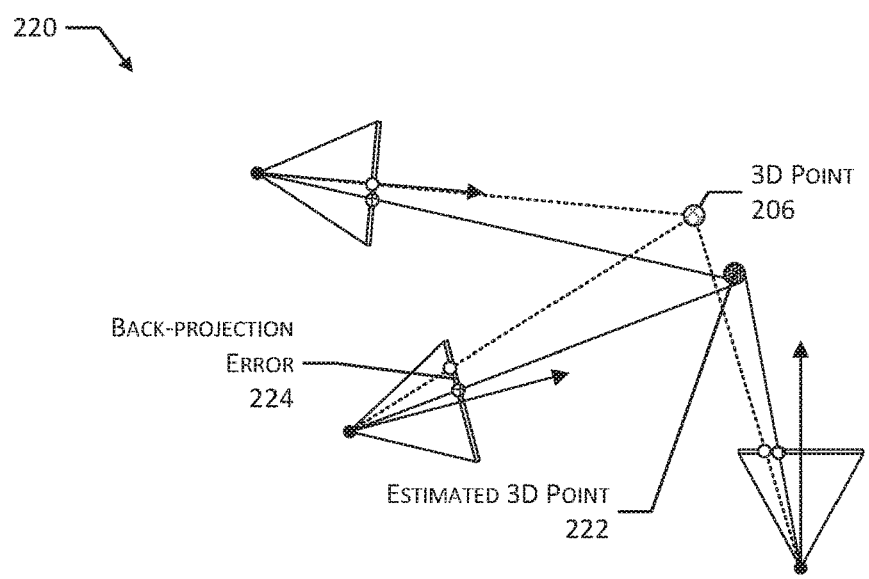

FIG. 2B illustrates back-projection error, according to some implementations. At 208 a model of a camera 106 is depicted showing a projection center 210, a normalized plane 212 (or image plane), and an optical axis 214 that extends from the projection center 210 through the normalized plane 212.

At 216 three cameras 106 are shown with their respective projection centers 210 and a projection or line that extends from the respective projection centers 210 to a 3D point 206. Also shown is a projection point 218 that indicates a point at which the projection intersects the normalized plane 212.

At 220 the three cameras 106 are shown at different translations and rotations with respect to the 3D point 206. Also shown are projections or lines that extend from each projection center 210 to the 3D point 206 and an estimated 3D point 222. The estimated 3D point 222 may be determined using the triangulation matrix. In some implementations, the triangulation score may be considered an indication of how closely a plurality of rays that are back-projected from the features 120 in the image data 112 intersect at the estimated 3D point 222. As described herein, the triangulation score may be determined using the minimum eigenvalue of the triangulation matrix and is a function of the camera 106 poses.

Also shown at 220 are the back-projections, or lines that extend from the estimated 3D point 222 to the projection centers 210 of the cameras 106. A back-projection error 224 may be visualized as a distance between a first intersection of the back-projection line and the normalized plane 212 and a second intersection between the projection line and the normalized plane 212.

The calibration data 126 results from the calibration module 114 adjusting the pose of the cameras 106 such that the triangulation cost and the back-projection errors 224 are simultaneously minimized.

Figure 3:
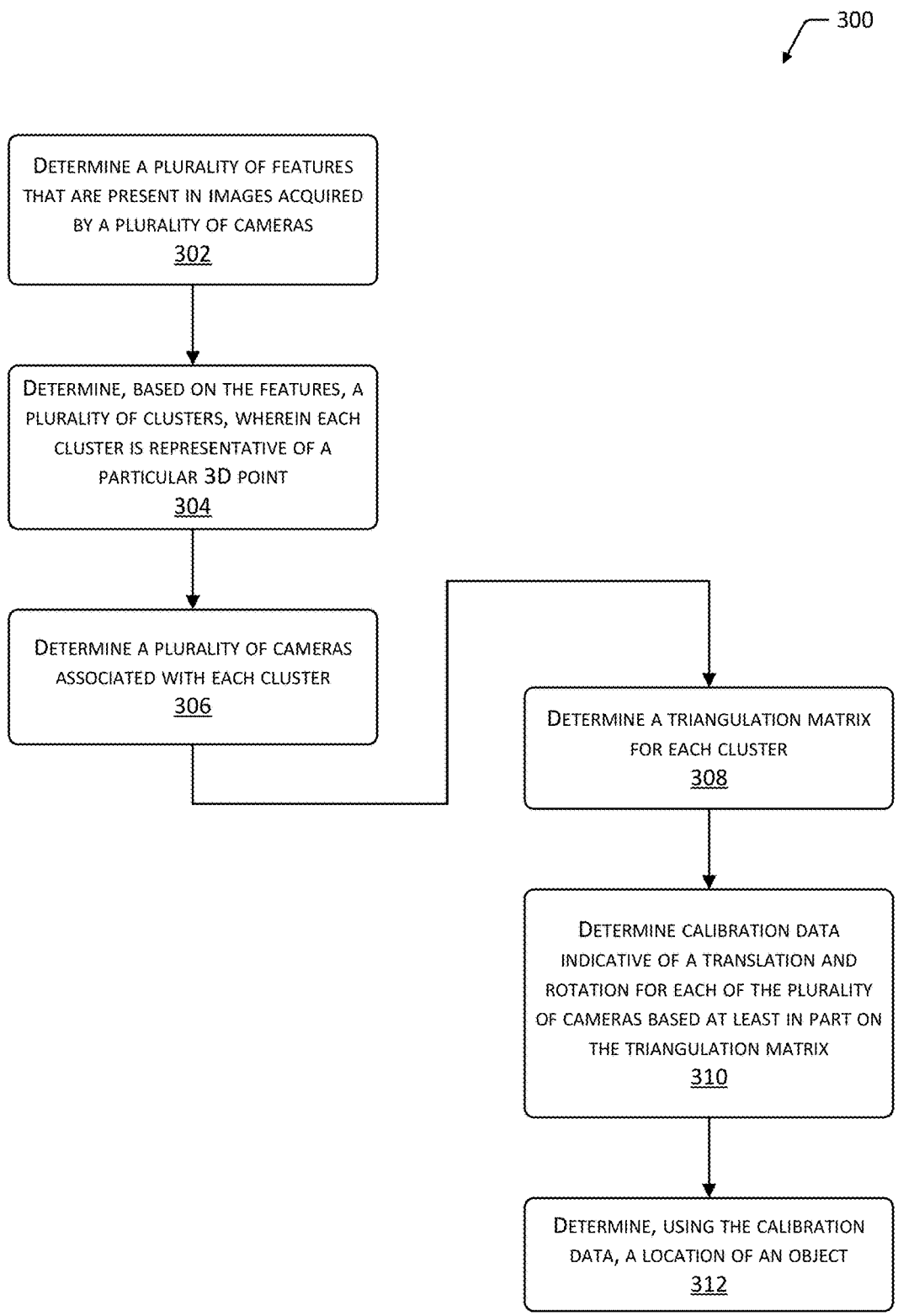
FIG. 3 is a flow diagram of a process to generate calibration data for a plurality of cameras in the same environment, according to some implementations.

FIG. 3 is a flow diagram 300 of a process to generate calibration data 126 for a plurality of cameras 106(1), . . . , 106(N) in the same environment, according to some implementations. The process may be implemented at least in part on one or more computing devices.

At 302 one or more features 120 are determined to be present in images acquired by a plurality of cameras 106. For example, one or more of the plurality of cameras 106(N) may acquire image data 112, such as each camera 106 acquiring an image. The features 120 are representative of 3D points 206 within the environment. The feature detector module 116 may use a SIFT algorithm to generate feature data 118 that is descriptive of the features 120 in the image data 112, and indicative of a position of the features 120 within the respective images, such as row and column of a pixel in the image. The features 120 may be described by a feature descriptor value. In some situations, a particular image may have a thousand or more features 120.

Other techniques may be used to generate the feature data 118. For example, features 120 in the images may be determined using speeded up robust feature (SURF), gradient location and orientation histogram (GLOH), histogram of oriented gradients (HOG), and so forth.

At 304 a plurality of clusters are determined. Each cluster may be representative of a particular 3D point 206. For example, the cluster module 122 may determine a subset of images 204 that have features 120 deemed to represent the same 3D point 206 depicted in them. In one implementation a feature 120 in one image and a feature 120 in another image may be deemed to represent the same 3D point 206 if the features 120 are within a threshold distance to one another in a feature vector space, or if the feature descriptor values are within a threshold value of one another. For example, the features 120 may be matched using the fast approximate nearest neighbor search (FLANN) library as implemented by OpenCV. OpenCV was developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the images 120. In still another implementation, functions such as those in the Machine Vision Toolbox for Matlab (MVTB) available using MATLAB as developed by MathWorks, Inc. of Natick, Mass., USA, may be utilized.

The clustering may include some errors. For example, a subset of images 204 may include some images which depict a different 3D point 206. In some implementations the process may operate to produce accurate calibration data 126 with up to 20% of the features 120 in a given subset of images 204 being associated with one or more other 3D points 206.

At 306 a plurality of cameras 106 associated with each of the clusters is determined. In one implementation, the plurality of cameras 106 may be those which obtained images in the subset of images 204 that are determined to depict the same 3D point 206. For example, metadata for each of the images in the subset of images 204 may indicate the camera identifier (ID) that was used to acquire that particular image. The plurality of cameras 106 may be the camera subset 202 that acquired the image data 112 for the subset of images 204.

At 308, a triangulation matrix is determined for each cluster. The triangulation matrix describes the translation and rotation of the cameras 106 associated with the cluster with respect to the particular 3D point 206 as depicted as the features 120 in the subset of images 204. For example, the triangulation matrix may be representative of a first translation and a first rotation of each camera 106 in the subset of the plurality of cameras 106 associated with the cluster.

To facilitate the description of one implementation of operation of the system, the following notation is used.

$E=\{e_0=[1\ 0\ 0]^T, e_1=[0\ 1\ 0]^T, e_2=[0\ 0\ 1]^T\}$ is the canonical orthonormal basis in $R^3$, where $R^3$ is three-dimensional (3)D space.

Unless otherwise specified, the abbreviation r.f. means "reference frame", namely a system of orthogonal axis E aligned with some physical object. For example, the camera r.f. is the system of orthogonal axis aligned with the camera optical axis and the image plane and centered on the camera projection center.

$R^N \setminus 0$ is the vector space $R^N$ without the null vector.

$SN=\{x \in R^{N+1}: \|x\|=1\}$ is the subspace of unit norm vectors in $R^{N+1}$, S1 is the unit circle in $R^2$ and S2 is the unit ball in $R^3$.

$I_N$ is the N×N identity matrix.

SO(3) is the space of orthonormal 3D matrices, i.e. the space of 3D rotations.

$v_1 \sim v_2$ means equivalence of vectors up to a non-zero scale factor, $v_1 \sim v_2 \Rightarrow \exists \lambda \cdot 0: v_1 = \lambda v_2$.

$\tilde{m}$ is the representation of the vector m in homogeneous coordinates, $\tilde{m} \sim [m^T\ 1]^T$.

$[v]_x$ is the skew symmetric matrix representing the 3D vector product, $[v]_x\ q = v \times q$.

Given L matrices $\{M_j \in R_{M \times N}\}_{j=0,\ldots,L-1}$, the tensor built stacking the matrices $M_j$ along the third dimension is represented as $T \equiv \{M_0 \ldots M_{L-1}\} \in R_{M \times N \times L}$.

$\otimes$ represents the tensor product defined as:

Given a matrix $M \in R_{M \times N}$ and a 3D tensor $T \in R_{N \times Q \times L}$, $$M \otimes T = \{M \cdot T_j\}_{j=0,\ldots,L} \in R_{M \times Q \times L}$$

Given a 3D tensor $T \in R_{M \times N \times L}$ and a matrix $M \in R_{N \times Q}$, $$T \otimes M = \{T_j \cdot M\}_{j=0,\ldots,L} \in R_{M \times Q \times L}$$

Given a 2 3D tensor $T \in R_{M \times N \times L}$ and $P \in R_{N \times Q \times L}$, $T \otimes P = \{T_j \cdot P_j\}_{j=0,\ldots,L} \in R_{M \times Q \times L}$ $$\overset{x}{\nabla} f = \left[ \frac{\partial f}{\partial x_0} \ldots \frac{\partial f}{\partial x_{N-1}} \right]$$

is the gradient of a scalar function $y=f(x): R^N \to R$.

$$\{\lambda, v\}_{j=0,\ldots,N-1}^M$$

is the eigen-system of a matrix $M \in R_{N \times N}$ that is the set of eigenvalues and the corresponding eigenvectors.

$m_{ij} \in S3$ is the projection of the 3D point $M_i \in R^3$ onto the j-th camera space. Throughout this disclosure, the image points are assumed to be expressed as metric unit norm vectors, which means that they are assumed to be transformed from the sensor r.f. onto the camera r.f.

Consider N cameras and an arbitrary system of axis assumed to be a fixed world r.f. $\chi_j(M)$ is defined as a rigid transformation mapping of the coordinates from the world r.f. onto the metric r.f. of the j-th camera:

$$M_j = \chi_j(M) = R_j M + t_j \quad \text{(Equation 1)}$$

where $\{R_j \in SO(3), t_j \in R^3\}$ are the components of the rigid motion, a 3D rotation matrix and a 3D translation vector. The corresponding image point is obtained by projecting $M_j$ on the unit ball, $$m_j = \eta(M) = \frac{M_j}{\|M_j\|} \in S3 \quad \text{(Equation 2)}$$

Equations 1 and 2 can be merged, and using the homogenous coordinates we obtain:

$$m_j \sim [R_j t_j][M^T 1]^T = [R_j t_j]\tilde{M} \quad \text{(Equation 3)}$$

The vector product with the vector $\tilde{m}_j$ in both sides of equation (3) converts it into a homogeneous equation, $$[\tilde{m}_j]_x (R_j M + t_j) = [\tilde{m}_j]_x [R_j t_j]\tilde{M} = A_j \tilde{M} = 0 \quad \text{(Equation 4)}$$

The projection of M on each one of the N cameras provides one equation in the form of Equation 4. These N equations can be stacked together to form a homogeneous linear system $$\begin{cases} A\tilde{M} = 0 \\ A = \begin{bmatrix} A_1 \\ \ldots \\ A_N \end{bmatrix} \end{cases} \quad \text{(Equation 5)}$$

Given enough image projections, the linear system becomes over constrained and the vector $\tilde{M}$ can be estimated in a least square sense as the solution to the minimization problem $$\tilde{M} = \underset{v \in R^4}{\operatorname{argmin}}\{\|Av\|^2\} \quad \text{(Equation 6)}$$

The triangulated point M in 3D metric space is obtained by means of the homogeneous normalization, $$M = h(\tilde{M}) \quad \text{(Equation 7)}$$

where the function $h: R^N \to R^{N-1}$ is defined as:

$$Q = [q\ w] \in R^N : q \in R^{N-1} \land w \neq 0 \quad \text{(Equation 8)}$$

$$h(Q) = \frac{q}{w}$$

$\tilde{M}$ is a 3D vector expressed in homogeneous coordinates, therefore it has only 3 degrees of freedom and Equation 4 is indeed a set of three equations, in which only two of them are actually independent equations. Therefore, we implicitly consider that each image projection contributes to the linear system (Equation 6) with two equations and the at least three image projections are needed to obtain a unique solution of two projections, four equations, and three unknowns.

The solution to Equation 6 is given by the eigenvector of the symmetric matrix $A=A^T A$ corresponding to its minimum eigenvalue. The minimum eigenvalue is equal to the residual error:

$$\begin{cases} j^* = \underset{j=0,\ldots,N-1}{\operatorname{argmin}} \{\lambda_{A,j}\} \\ \tilde{M} \sim \upsilon_{A,j^*} \\ \underset{v \in R^4}{\min} \{\|Av\|^2\} = \|A\upsilon_{A,j^*}\|^2 = \lambda_{j^*} \end{cases} \quad \text{(Equation 9)}$$

Equation 9 describes a Direct Linear Transform (DLT) for 3D triangulation of the feature 120 in space. For ease of notation in the remaining discussion $(\upsilon_{j^*}, \lambda_{j^*})$ denotes a minimum eigenvector and minimum eigenvalue, respectively.

Let $M \in R^{N \times N}$ be a real defined symmetric matrix, parametric in p, and $\{\lambda_i, \upsilon_i\}_{i=0,\ldots,N-1}$ eigen-system. By differentiating the characteristic equation with respect to p to obtain $$M\upsilon_i = \lambda_i \upsilon_i \quad \text{(Equation 10)}$$
$$\frac{\partial M}{\partial p}\upsilon_i + M\frac{\partial \upsilon_i}{\partial p} = \frac{\partial \lambda_i}{\partial p}\upsilon_i + \lambda_i \frac{\partial \upsilon_i}{\partial p}$$

It is useful to recall that (a) by definition an eigenvector is a unit norm vector and therefore its derivative with respect to whatever parameter must be orthogonal to the eigenvector itself and (b) the row-column product by a symmetric matrix is commutative, namely given a symmetric matrix $M \in R^{N \times N}$ and two vectors $a,b \in R^N$ then $a^T M b = M a^T b$.

By multiplying both sides on the left by the corresponding eigenvector $$\upsilon_i^T \frac{\partial M}{\partial p}\upsilon_i + \upsilon_i^T M \frac{\partial \upsilon_i}{\partial p} = \upsilon_i^T \frac{\partial \lambda_i}{\partial p}\upsilon_i + \upsilon_i^T \lambda_i \frac{\partial \upsilon_i}{\partial p} \quad \text{(Equation 11)}$$

the derivative of the eigenvalue $\lambda_i$ with respect to p is obtained by:

$$\frac{\partial \lambda_i}{\partial p} = \upsilon_i^T \frac{\partial M}{\partial p}\upsilon_i \quad \text{(Equation 12)}$$

In order to compute the derivative of an eigenvector with respect to the same parameter p, from (a) described above it follows that derivative of the j-th eigenvector can be expressed as a linear combination of the other eigenvectors:

$$\frac{\partial \upsilon_i}{\partial p} = \sum_{j \neq i} \alpha_j \upsilon_j \quad \text{(Equation 13)}$$

By inserting Equation 12 and Equation 13 (also known as the Perturbation Theorem) into Equation 11, and using the same observation (a) and (b) described above, Equation 14 is obtained:

$$M\upsilon_i = \lambda_i \upsilon_i \quad \text{(Equation 14)}$$
$$\frac{\partial M}{\partial p}\upsilon_i + M\frac{\partial \upsilon_i}{\partial p} = \frac{\partial \lambda_i}{\partial p}\upsilon_i + \lambda_i \frac{\partial \upsilon_i}{\partial p}$$
$$\frac{\partial M}{\partial p}\upsilon_i + M\sum_{j \neq i} \alpha_j \upsilon_j = \left(\upsilon_i^T \frac{\partial M}{\partial p}\upsilon_i\right)\upsilon_i + \lambda_i \sum_{j \neq i} \alpha_j \upsilon_j$$
$$\frac{\partial M}{\partial p}\upsilon_i + \sum_{j \neq i} \alpha_j \lambda_j \upsilon_j = \left(\upsilon_i^T \frac{\partial M}{\partial p}\upsilon_i\right)\upsilon_i + \lambda_i \sum_{j \neq i} \alpha_j \upsilon_j$$
$$\sum_{j \neq i} \alpha_j (\lambda_j - \lambda_i)\upsilon_j = \left(\upsilon_i^T \frac{\partial M}{\partial p}\upsilon_i\right)\upsilon_i - \frac{\partial M}{\partial p}\upsilon_i$$

Therefore $\forall k \neq i$:

$$\upsilon_k^T = \sum_{j \neq i} \alpha_j (\lambda_j - \lambda_i)\upsilon_j = \alpha_k(\lambda_k - \lambda_i) = \upsilon_k^T \frac{\partial M}{\partial p}\upsilon_i \quad \text{(Equation 15)}$$
$$\alpha_k = \upsilon_k^T \frac{\partial M}{\partial p} \cdot \frac{1}{(\lambda_i - \lambda_k)}$$

Equation 15 provides the coefficients for the linear combination described in Equation 13, which represents the derivative of the j-th eigenvector with respect to p.

Equations 12 and 13 can be further specified once the parameter (or the parameter vector) p is defined and matrix function $M=M(p)$ and its derivative $$\frac{\partial M}{\partial p}$$

are explicitly computed.

At 310 the calibration data 126 is determined. The calibration data 126 is indicative of a translation and a rotation for each of the plurality of cameras 106, with respect to a designated camera 106. For example, a designated camera 106(1) may specified from one of the cameras 106 in the environment. The calibration data 126 may then be determined with respect to the axes of that designated camera 106(1). As described, the calibration data 126 may be determined based at least in part on the triangulation matrix for each of the cameras 106.

Consider M 3D points that correspond to or otherwise represent the features 120 in 3D space, and N distinct cameras 106. Each point M, with respect to each camera N has a corresponding image projection, $$\{m_{ij}\}_{\substack{i=1,\ldots,M \\ j=1,\ldots,N}}.$$

The cluster module 122 clusters the images into subsets of images 204 in which the images each depict the same feature 120. With this subset of images 204 of the same point M for the feature 120, the calibration data 126 may be determined by perturbing or adjusting the pose (rotation about the axes and translation with respect to the axes) of each camera 106 in such a way that an objective function indicative of an overall triangulation score is minimized.

The overall triangulation score comprises a sum of two factors: a triangulation cost and a back-projection error. The triangulation cost is determined as a sum of the target eigenvalues, in particular the minimum eigenvalues, of the triangulation matrices generated by each group of features 120. The back-projection error is determined as an overall distance between the features 120 in the image and an analytical projection on the normalized planes 212 of each camera 106 of the 3D points 206 representative of those features 120, where the latter are given by the minimum eigenvectors of the same triangulation matrices.

The calibration data 126 may thus be generated using the following equation:

$$(R_j, t_j)_{j=1,\ldots,N} = \min_{\substack{R_j \in SO(3) \\ t_j \in R^3}} \left\{ \sum_{i=0,\ldots,N} \lambda_i^2 + \sum_{\substack{i=0,\ldots,M-1 \\ j=0,\ldots,M-1}} \|h(R_j h(v_i) + t_j) - h(m_{ij})\|^2 \right\} \quad \text{(Equation 16)}$$

where the function h is the homogeneous normalization (Equation 8) and $(v_i, \lambda_i)$ are a solution of the DLT triangulation of the i-th image point cluster, i.e. the minimum eigenvalue and the minimum eigenvector of the corresponding triangulation homogeneous system of Equation 9.

In one implementation, Equation 16 may be solved using the Levenberg-Marquardt optimization algorithm. To facilitate the use of the Levenberg-Marquardt optimization, an analytical expression of the derivatives of the objective function may be determined with respect to the variables. This expression may be computed by using the chaining derivative rule and derivative blocks described below in the section OBJECTIVE FUNCTION DERIVATIVES.

The implementation of the equations described above provides an implicit formulation of the 3D points 206 that describe the features 120 as solutions of a list of DLT triangulations. This eliminates the calculation of the location of the coordinates in 3D space for the features 120. This significantly reduces the dimensionality of the calculations from (3M+6(N-1)) to (6(N-1)). For example, in systems that involve the 3D reconstruction of the environment, such as generating a point cloud, the number of features 120 and their points that have 3D coordinates calculated may be into the millions. In comparison, the number of cameras 106 in the environment is significantly less.

The removal of the calculation of the 3D coordinates for the features 120 also allows for improved handling of points for features 120 that are outliers. For example, the Levenberg-Marquardt algorithm with a reweighting scheme of IRLS (Iterative Reweighted Least Squares) may be used to adjust for outlier features 120.

At 312, a location of an object in the environment is determined using the calibration data 126. For example, image data 112 from a plurality of cameras 106 may be obtained of an object, such as a cart, that is in the environment. Given the now known translation and rotation of the cameras 106 that acquired the image data 112, various techniques may be used to determine the location of the object with respect to the facility reference frame 110. For example, based on different apparent positions of the object within the images, and given the calibration data 126, a linear transformation may be performed that determines the location in 3D space.

Objective Function Derivatives
Homogeneous Normalization $$q \in R^N,\ w \in R \setminus 0,\ \tilde{v} = [q\ \ w] \in R^{N+1} \quad \text{(Equation 17)}$$

$$\begin{cases} v = h(\tilde{v}) = \dfrac{q}{w} \\ \overset{\tilde{v}}{\nabla} h = \dfrac{1}{w} \cdot [I_n\ \ -v] \end{cases}$$

Vector Norm and Unit Norm Normalization $$v \in R^N \setminus 0 \quad \text{(Equation 18)}$$

$$\begin{cases} r = r(v) = \sqrt{v^T v} \\ \hat{v} = \eta(v) = \dfrac{v}{r} \\ \overset{v}{\nabla} r = \hat{v}^T \\ \overset{v}{\nabla} \eta = \dfrac{1}{r} \cdot (I_N - (\hat{v}\hat{v}^T)) \end{cases}$$

Rotations

The derivation of function containing rotational components requires additional explanation. We parameterize small rotations $dR \cong I_3$ using the quaternion q built from the parameter vector $d\ \omega \in R^3$, as $$q = [\sqrt{1-d\omega^T d\omega}\, d\omega^T]^T \in S3 \subset R^4$$

$$dR \cong I + 2[d\omega]_x \quad \text{(Equation 19)}$$

Using this parameterization, a small variation of a 3D rotation $\overline{R}$ can be written as a function of $d\omega$ $$\begin{cases} R(\overline{R}, d\omega) = \overline{R} \cdot (I + 2[d\omega]_x) \\ \overset{d\omega}{\nabla} R = 2\overline{R} \otimes \{[e_i]_x\}_{i=0,1,2} \end{cases} \quad \text{(Equation 20)}$$

Rigid Transformation $$M \in R^3,\ R \in SO(3),\ t \in R^3,\ d\omega \in R^3,\ R = R(R, d\omega) \quad \text{(Equation 21)}$$

$$\begin{cases} M_T = RM + t \\ \overset{M}{\nabla} M_t = R \\ \overset{t}{\nabla} M_t = I_3 \\ \overset{d\omega}{\nabla} M_t = -2R[M]_x \end{cases}$$

Triangulation Matrix Block $$m \in S4,\ R \in SO(3),\ t \in R^3,\ d\omega \in R^3,\ R = R(R, d\omega) \quad \text{(Equation 22)}$$

$$\begin{cases} A = [m]_x \cdot [R\ \ t] \\ \overset{m}{\nabla} A = X_3 \otimes [R\ \ t] \\ \overset{t}{\nabla} A = [m]_x \otimes [0_{323}\ \ I_3] \\ \overset{d\omega}{\nabla} A = [m]_x \otimes [\overset{d\omega}{\nabla}\ \ 0_{313}] \end{cases}$$

where $X_3$ is the tensor $X_3=\{[e_0]_x,[e_1]_x,[e_2]_x\}$ and $I_3$ is the $X=\{e_0, e_1, e_2\}$.

Eigen-System of a Symmetric Matrix

Consider again Equation 9. The triangulation matrix A is a function of the 3D pose (rotation and translation) of the cameras 106 with valid image projections, i.e. the cameras 106 where the corresponding 3D point of the feature 120 is actually depicted. Therefore, the eigen-system itself is a function of the same parameters. The computation of the derivative of both the minimum eigenvalue of A and the corresponding eigenvector with respect to each of these parameters can be done by means of the Perturbation Theorem, once the derivatives of triangulation matrix A is known.

Let us denote with p any of the calibration parameters, the derivative $$\frac{\partial A}{\partial p}$$

is obtained by stacking the derivatives of each triangulation block, $$\left\{\frac{\partial A_j}{\partial p}\right\}_{j=0,\ldots,N}$$

and using the basic derivation rules:

$$\begin{cases} A = \begin{bmatrix} A_0 \\ \ldots \\ A_{N-1} \end{bmatrix} \\ \frac{\partial A}{\partial p} = \begin{bmatrix} \frac{\partial A_0}{\partial p} \\ \ldots \\ \frac{\partial A_{N-1}}{\partial p} \end{bmatrix} \end{cases}$$ (Equation 23)

$$\begin{cases} A = A^T A \\ \frac{\partial A}{\partial p} = \frac{\partial A^T}{\partial p} A + A^T \frac{\partial A}{\partial p} \end{cases}$$

Using the above equations and the results from Equations 12 and 13, the derivative of the minimum eigenvalue and the minimum eigenvector of each triangulation system with respect to the 3D pose parameters of each camera 106 can be determined.

Figure 4:
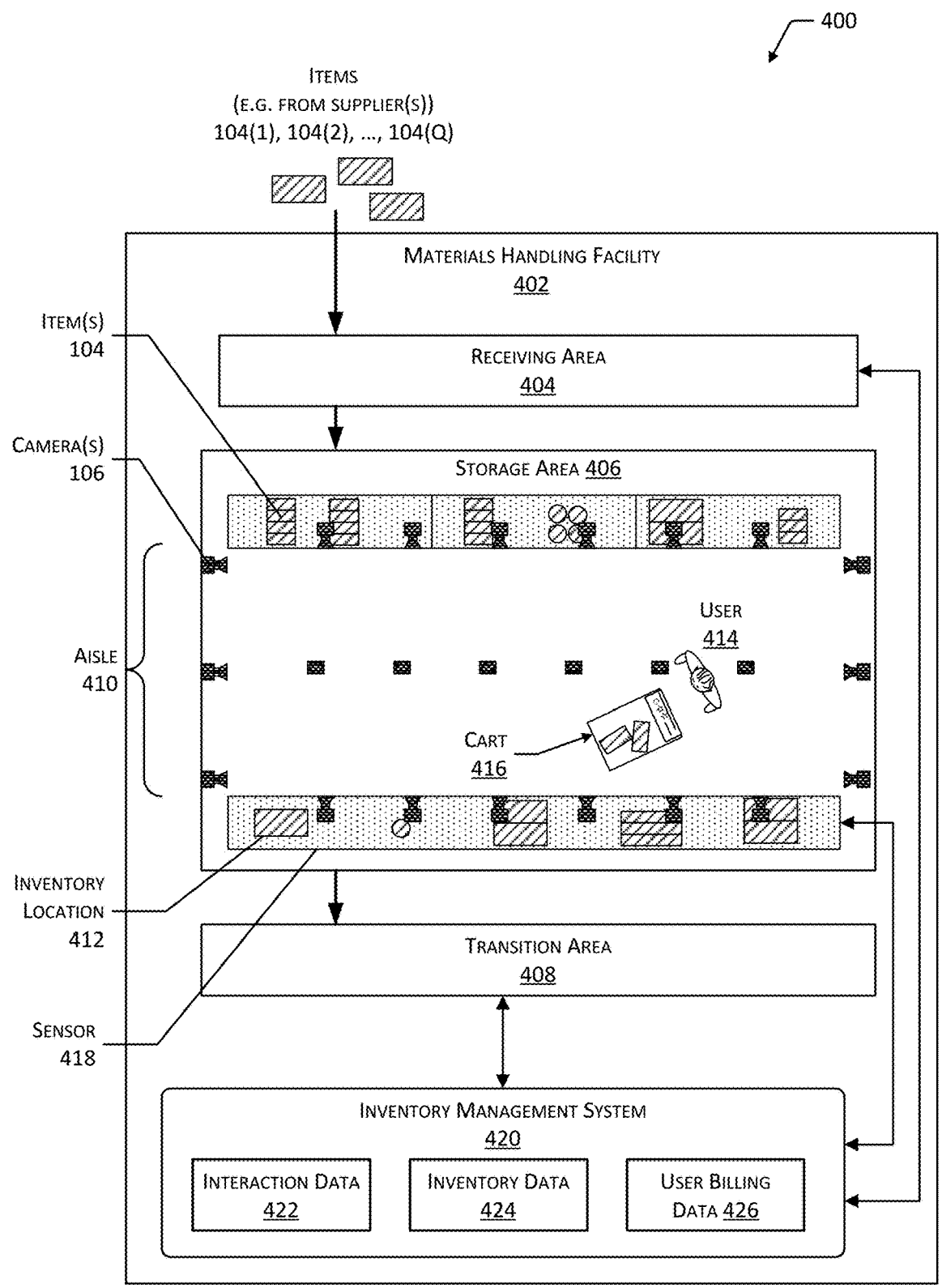
FIG. 4 is a block diagram illustrating a materials handling facility (facility) using the system, according to some implementations.

FIG. 4 is a block diagram 400 illustrating a materials handling facility (facility) 402 using the system 100, according to some implementations. A facility 402 comprises one or more physical structures or areas within which one or more items 104(1), 104(2), ..., 104(Q) may be held. As used in this disclosure, letters in parenthesis such as "(0)" indicate an integer value greater than or equal to zero. The items 104 may comprise physical goods, such as books, pharmaceuticals, repair parts, electronic gear, and so forth.

The facility 402 may include one or more areas designated for different functions with regard to inventory handling. In this illustration, the facility 402 includes a receiving area 404, a storage area 406, and a transition area 408.

The receiving area 404 may be configured to accept items 104, such as from suppliers, for intake into the facility 402. For example, the receiving area 404 may include a loading dock at which trucks or other freight conveyances unload the items 104. In some implementations, the items 104 may be processed, at the receiving area 404, to generate item data. For example, an item 104 may be weighed, imaged or otherwise scanned to develop reference images or representations of the item 104 at the receiving area 404.

The storage area 406 is configured to store the items 104. The storage area 406 may be arranged in various physical configurations. In one implementation, the storage area 406 may include one or more aisles 410. The aisle 410 may be configured with, or defined by, inventory locations 412 on one or both sides of the aisle 410. The inventory locations 412 may include one or more of a shelf 102, a rack, a case, a cabinet, a bin, a floor location, or other suitable storage mechanisms for holding, supporting, or storing the items 104. For example, the inventory locations 412 may comprise shelves 102 with lanes designated therein. The inventory locations 412 may be affixed to the floor 108 or another portion of the structure of the facility 402. The inventory locations 412 may also be movable such that the arrangements of aisles 410 may be reconfigurable. In some implementations, the inventory locations 412 may be configured to move independently of an outside operator. For example, the inventory locations 412 may comprise a rack with a power source and a motor, operable by a computing device to allow the rack to move from one location within the facility 402 to another.

One or more users 414(1), 414(2), ..., 414(U) and carts 416(1), 416(2), ..., 416(T) or other material handling apparatus may move within the facility 402. For example, the user 414 may move about within the facility 402 to pick or place the items 104 in various inventory locations 412, placing them in the cart 416 for ease of transport. The cart 416 is configured to carry or otherwise transport one or more items 104. For example, the cart 416 may include a basket, cart, bag, bin, and so forth. In other implementations, other material handling apparatuses such as robots, forklifts, cranes, aerial drones, and so forth, may move about the facility 402 picking, placing, or otherwise moving the items 104. For example, a robot may pick an item 104 from a first inventory location 412(1) and move the item 104 to a second inventory location 412(2).

While the storage area 406 is depicted as having one or more aisles 410, inventory locations 412 storing the items 104, sensors 418, and so forth, it is understood that the receiving area 404, the transition area 408, or other areas of the facility 402 may be similarly equipped. Furthermore, the arrangement of the various areas within the facility 402 is depicted functionally rather than schematically. For example, in some implementations, multiple different receiving areas 404, storage areas 406, and transition areas 408 may be interspersed rather than segregated in the facility 402.

The facility 402 may include, or be coupled to, the inventory management system 420. The inventory management system 420 is configured to interact with users 414 or devices such as sensors 418, robots, material handling equipment, computing devices, and so forth, in one or more of the receiving area 404, the storage area 406, or the transition area 408.

During operation of the facility 402, sensors 418 may be configured to provide sensor data, such as the image data 112, to the inventory management system 420. The sensor data may include image data 112, non-image data, weight sensor data obtained from weight sensors 418(5), and so forth. The sensors 418 may include, but are not limited to, cameras 106, distance sensors 418(1), optical sensor arrays 418(13), proximity sensors 418(14), and so forth. The sensors 418 may be stationary or mobile, relative to the facility 402. For example, the inventory locations 412 may contain weight sensors 418(5) to acquire weight sensor data of items 104 stowed therein, cameras 106 to acquire images of picking or placement of items 104 on shelves 102, optical sensor arrays 418(13) to detect shadows of the user's 414 hands at the inventory locations 412, and so forth. In another example, the facility 402 may include cameras 106 to obtain image data 112 that comprises images of the user 414 or other objects in the facility 402. The sensors 418 are described in more detail below with regard to FIG. 5.

The inventory management system 420 or other systems may use the sensor data to determine the location of objects within the facility 402, movement of the objects, or provide other functionality. Objects may include, but are not limited to, items 104, users 414, carts 416, and so forth. For example, a series of images acquired by the camera 106 may indicate removal by the user 414 of an item 104 from a particular location on the inventory location 412 and placement of the item 104 on or at least partially within the cart 416.

The facility 402 may be configured to receive different kinds of items 104 from various suppliers and to store them until a customer orders or retrieves one or more of the items 104. A general flow of items 104 through the facility 402 is indicated by the arrows of FIG. 4. Specifically, as illustrated in this example, items 104 may be received from one or more suppliers, such as manufacturers, distributors, wholesalers, and so forth, at the receiving area 404. In various implementations, the items 104 may include merchandise, commodities, perishables, or any suitable type of item 104, depending on the nature of the enterprise that operates the facility 402.

Upon being received from a supplier at the receiving area 404, the items 104 may be prepared for storage in the storage area 406. For example, in some implementations, items 104 may be unpacked or otherwise rearranged. The inventory management system 420 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of a measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 404, items 104 may be stored within the storage area 406. In some implementations, like items 104 may be stored or displayed together in the inventory locations 412 such as in bins, on shelves 102, hanging from pegboards, and so forth. In this implementation, all items 104 of a given kind are stored in one inventory location 412. In other implementations, like items 104 may be stored in different inventory locations 412.

For example, to optimize retrieval of certain items 104 having frequent turnover within a large physical facility 402, those items 104 may be stored in several different inventory locations 412 to reduce congestion that might occur at a single inventory location 412.

When a customer order specifying one or more items 104 is received, or as a user 414 progresses through the facility 402, the corresponding items 104 may be selected or "picked" from the inventory locations 412 containing those items 104. In various implementations, item picking may range from manual to completely automated picking. For example, in one implementation, a user 414 may have a list of items 104 they desire and may progress through the facility 402 picking items 104 from inventory locations 412 within the storage area 406 and placing those items 104 into a cart 416. In other implementations, employees of the facility 402 may pick items 104 using written or electronic pick lists derived from customer orders. These picked items 104 may be placed into the cart 416 as the employee progresses through the facility 402.

After items 104 have been picked, the items 104 may be processed at a transition area 408. The transition area 408 may be any designated area within the facility 402 where items 104 are transitioned from one location to another or from one entity to another. For example, the transition area 408 may be a packing station within the facility 402. When the item 104 arrives at the transition area 408, the item 104 may be transitioned from the storage area 406 to the packing station. Information about the transition may be maintained by the inventory management system 420.

In another example, if the items 104 are departing the facility 402, a list of the items 104 may be obtained and used by the inventory management system 420 to transition responsibility for, or custody of, the items 104 from the facility 402 to another entity. For example, a carrier may accept the items 104 for transport with that carrier accepting responsibility for the items 104 indicated in the list. In another example, a user 414 may purchase or rent the items 104 and remove the items 104 from the facility 402. During use of the facility 402, the user 414 may move about the facility 402 to perform various tasks, such as picking or placing the items 104 in the inventory locations 412.

To facilitate operation of the facility 402, the inventory management system 420 may use image data 112 obtained by at least a portion of the plurality of cameras 106, or data from other sensors 418 of different types during operation. The system may generate one or more of the inventory data 424, interaction data 422, or user billing data 426. For example, the inventory management system 420 processes the image data 112 to determine the interaction data 422.

The interaction data 422 may provide information about an interaction, such as a pick of an item 104 from the inventory location 412, a place of an item 104 to the inventory location 412, a touch made to an item 104 at the inventory location 412, a gesture associated with an item 104 at the inventory location 412, and so forth. The interaction data 422 may include one or more of the type of interaction, interaction location identifier indicative of where from the inventory location 412 the interaction took place, item identifier, quantity change to the item 104, user identifier, and so forth. The interaction data 422 may then be used to further update the item data. For example, the quantity of items 104 on hand at a particular lane on the shelf 102 may be changed based on an interaction that picks or places one or more items 104.

As described above, the inventory management system 420 may perform other operations, such as determining inventory data 424, determining user billing data 426, and so forth. For example, based on interaction data 422 showing a pick of an item 104 from an inventory location 412 and placement into the cart 416, user billing data 426 associated with the user 414 may be generated. Operation of the inventory management system 420 is discussed in more detail below with regard to FIG. 6.

Figure 5:
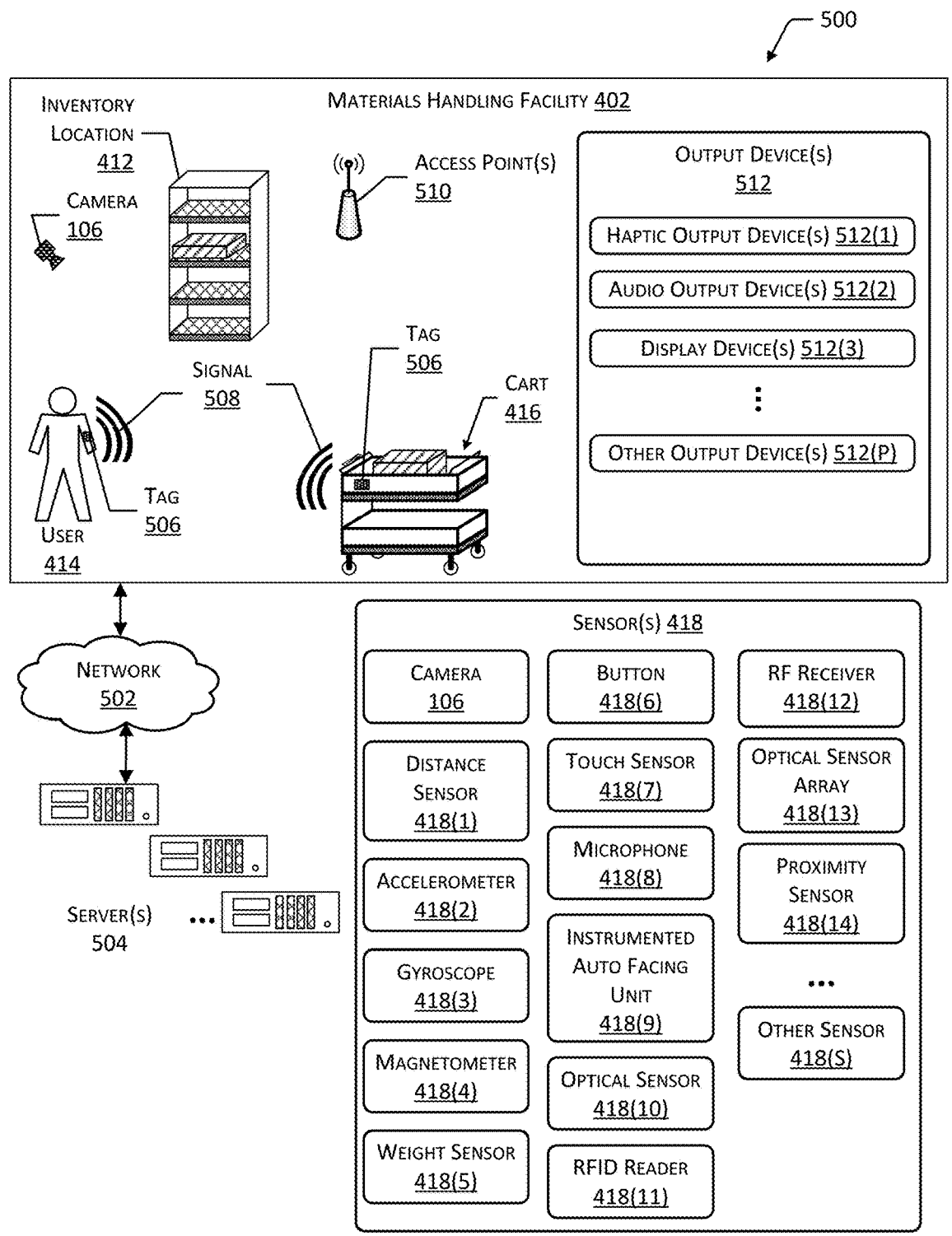
FIG. 5 is a block diagram illustrating additional details of the facility, according to some implementations.

FIG. 5 is a block diagram 500 illustrating additional details of the facility 402, according to some implementations. The facility 402 may be connected to one or more networks 502, which in turn connect to one or more servers 504. The network 502 may include private networks such as an institutional or personal intranet, public networks such as the Internet, or a combination thereof. The network 502 may utilize wired technologies (e.g., wires, fiber optic cables, and so forth), wireless technologies (e.g., radio frequency, infrared, acoustic, optical, and so forth), or other connection technologies. The network 502 is representative of any type of communication network, including one or more of data networks or voice networks. The network 502 may be implemented using wired infrastructure (e.g., copper cable, fiber optic cable, and so forth), a wireless infrastructure (e.g., cellular, microwave, satellite, and so forth), or other connection technologies.

The servers 504 may be configured to execute one or more modules or software applications associated with the inventory management system 420 or other systems. While the servers 504 are illustrated as being in a location outside of the facility 402, in other implementations, at least a portion of the servers 504 may be located at the facility 402. The servers 504 are discussed in more detail below with regard to FIG. 6.

The users 414, the carts 416, or other objects in the facility 402 may be equipped with one or more tags 506. The tags 506 may be configured to emit a signal 508. In one implementation, the tag 506 may be a radio frequency identification (RFID) tag 506 configured to emit an RF signal 508 upon activation by an external signal. For example, the external signal may comprise a radio frequency signal or a magnetic field configured to energize or activate the RFID tag 506. In another implementation, the tag 506 may comprise a transmitter and a power source configured to power the transmitter. For example, the tag 506 may comprise a Bluetooth Low Energy (BLE) transmitter and battery. In other implementations, the tag 506 may use other techniques to indicate presence of the tag 506. For example, an acoustic tag 506 may be configured to generate an ultrasonic signal 508, which is detected by corresponding acoustic receivers. In yet another implementation, the tag 506 may be configured to emit an optical signal 508.

The inventory management system 420 may be configured to use the tags 506 for one or more of identification of the object, determining a location of the object, and so forth. For example, the users 414 may wear tags 506, the carts 416 may have tags 506 affixed, and so forth, which may be read and, based at least in part on signal strength, used to determine identity and location.

Generally, the inventory management system 420 or other systems associated with the facility 402 may include any number and combination of input components, output components, and servers 504.

The one or more sensors 418 may be arranged at one or more locations within the facility 402. For example, the sensors 418 may be mounted on or within a floor 108, wall, at a ceiling, at an inventory location 412, on a cart 416, may be carried or worn by a user 414, and so forth.

The sensors 418 may include one or more cameras 106 or other imaging sensors. The one or more cameras 106 may include imaging sensors configured to acquire images of a scene. The cameras 106 are configured to detect light in one or more wavelengths including, but not limited to, terahertz, infrared, visible, ultraviolet, and so forth. The cameras 106 may comprise charge coupled devices (CCD), complementary metal oxide semiconductor (CMOS) devices, microbolometers, and so forth. The inventory management system 420 may use image data 112 acquired by the cameras 106 during operation of the facility 402. For example, the inventory management system 420 may identify items 104, users 414, carts 416, and so forth, based at least in part on their appearance within the image data 112 acquired by the cameras 106.

One or more distance sensors 418(1) may also be included in the sensors 418. The distance sensors 418(1) are configured to acquire spatial or three-dimensional (3D) data, such as depth information, about objects within a FOV. The distance sensors 418(1) may include range cameras, lidar systems, sonar systems, radar systems, structured light systems, stereovision systems, optical interferometry systems, stadiametric, acoustic, and so forth. For example, the distance sensors 418(1) may comprise optical time-of-flight (ToF) sensors, ultrasonic sensors, and so forth. The inventory management system 420 may use the data acquired by the distance sensors 418(1) to identify objects, determine a location of an object in 3D real space, and so forth.

The distance sensors 418(1) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 418 such as a camera 106. Based on an apparent distance between the features of the structured light pattern, the distance to the object may be calculated. Other techniques may also be used to determine distance to the object, such as stereovision.

The sensors 418 may include one or more accelerometers 418(2), which may be worn or carried by the user 414, mounted to the cart 416, and so forth. The accelerometers 418(2) may provide information such as the direction and magnitude of an imposed acceleration. Data such as rate of acceleration, determination of changes in direction, speed, and so forth, may be determined using the accelerometers 418(2).

A gyroscope 418(3) may provide information indicative of rotation of an object affixed thereto. For example, other objects may be equipped with a gyroscope 418(3) to provide data indicative of a change in orientation of the object.

A magnetometer 418(4) may be used to determine an orientation by measuring ambient magnetic fields, such as the terrestrial magnetic field. The magnetometer 418(4) may be worn or carried by the user 414, mounted to the cart 416, and so forth.

Weight sensors 418(5) are configured to measure the weight of a load. The weight sensors 418(5) may be configured to measure the weight of the load at one or more of the inventory locations 412, the cart 416, on the floor 108 of the facility 402, and so forth. For example, the shelf 102 may include a plurality of lanes or platforms, with one or more weight sensors 418(5) beneath each one to provide weight sensor data about an individual lane or platform. The weight sensors 418(5) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 418(5) may operate as transducers that generate one or more signals 508 based on an applied force, such as that of the load due to gravity. For example, the weight sensor 418(5) may comprise a load cell having a strain gauge and a structural member that deforms slightly when weight is applied. By measuring a change in the electrical characteristic of the strain gauge, such as capacitance or resistance, the weight may be determined. In another example, the weight sensor 418(5) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 420 may use the data acquired by the weight sensors 418(5) to identify an object, determine a change in the quantity of objects, determine a location of an object, maintain shipping records, and so forth.

One or more buttons 418(6) may be configured to accept input from the user 414. The buttons 418(6) may comprise mechanical, capacitive, optical, or other mechanisms. For example, the buttons 418(6) may comprise mechanical switches configured to accept an applied force from a touch of the user 414 to generate an input signal. The inventory management system 420 may use data from the buttons 418(6) to receive information from the user 414. For example, the cart 416 may be configured with a button 418(6) to accept input from the user 414 and send information indicative of the input to the inventory management system 420.

The sensors 418 may include one or more touch sensors 418(7). The touch sensors 418(7) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 420 may use data from the touch sensors 418(7) to receive information from the user 414. For example, the touch sensor 418(7) may be integrated with the cart 416 to provide a touchscreen with which the user 414 may select from a menu one or more particular items 104 for picking, enter a manual count of items 104 at an inventory location 412, and so forth.

One or more microphones 418(8) may be configured to acquire information indicative of sound present in the environment. In some implementations, arrays of microphones 418(8) may be used. These arrays may implement beamforming techniques to provide for directionality of gain. The inventory management system 420 may use the one or more microphones 418(8) to acquire information from acoustic tags 506, accept voice input from the users 414, determine ambient noise level, and so forth.

The sensors 418 may include instrumented auto facing units (IAFUs) 418(9). The IAFU 418(9) may comprise a position sensor configured to provide data indicative of displacement of a pusher. As an item 104 is removed from the IAFU 418(9), the pusher moves, such as under the influence of a spring, and pushes the remaining items 104 in the IAFU 418(9) to the front of the inventory location 412. By using data from the position sensor, and given item data such as a depth of an individual item 104, a count may be determined, based on a change in position data. For example, if each item 104 is 1 inch deep, and the position data indicates a change of 5 inches, the quantity held by the IAFU 418(9) may have changed by 5 items 104. This count information may be used to confirm or provide a cross check for a count obtained by other means, such as analysis of the weight sensor data.

The sensors 418 may include one or more optical sensors 418(10). The optical sensors 418(10) may be configured to provide data indicative of one or more of color or intensity of light impinging thereupon. For example, the optical sensor 418(10) may comprise a photodiode and associated circuitry configured to generate a signal 508 or data indicative of an incident flux of photons. As described below, the optical sensor array 418(13) may comprise a plurality of the optical sensors 418(10). The optical sensors 418(10) may include photodiodes, photoresistors, photovoltaic cells, quantum dot photoconductors, bolometers, pyroelectric infrared detectors, and so forth. For example, the optical sensor 418(10) may use germanium photodiodes to detect infrared light.

One or more radio frequency identification (RFID) readers 418(11), near field communication (NFC) systems, and so forth, may be included as sensors 418. For example, the RFID readers 418(11) may be configured to read the RF tags 506. Information acquired by the RFID reader 418(11) may be used by the inventory management system 420 to identify an object associated with the RF tag 506 such as the item 104, the user 414, the cart 416, and so forth. For example, based on information from the RFID readers 418(11) detecting the RF tag 506 at different times and RFID readers 418(11) having different locations in the facility 402, a velocity of the RF tag 506 may be determined.

One or more RF receivers 418(12) may also be included as sensors 418. In some implementations, the RF receivers 418(12) may be part of transceiver assemblies. The RF receivers 418(12) may be configured to acquire RF signals 508 associated with Wi-Fi, Bluetooth, ZigBee, 2G, 3G, 4G, LTE, or other wireless data transmission technologies. The RF receivers 418(12) may provide information associated with data transmitted via radio frequencies, signal strength of RF signals 508, and so forth. For example, information from the RF receivers 418(12) may be used by the inventory management system 420 to determine a location of an RF source, such as a communication interface onboard the cart 416.

An optical sensor array 418(13) may comprise one or optical sensors 418(10). The optical sensors 418(10) may be arranged in a regular, repeating, or periodic two-dimensional arrangement such as a grid. The optical sensor array 418(13) may generate image data 112. For example, the optical sensor array 418(13) may be arranged within or below an inventory location 412 and obtain information about shadows of items 104, hand of the user 414, and so forth.

The sensors 418 may include proximity sensors 418(14) used to determine presence of an object, such as the user 414, the cart 416, and so forth. The proximity sensors 418(14) may use optical, electrical, ultrasonic, electromagnetic, or other techniques to determine a presence of an object. In some implementations, the proximity sensors 418(14) may use an optical emitter and an optical detector to determine proximity. For example, an optical emitter may emit light, a portion of which may then be reflected by the object back to the optical detector to provide an indication that the object is proximate to the proximity sensor 418(14). In other implementations, the proximity sensors 418(14) may comprise a capacitive proximity sensor 418(14) configured to provide an electrical field and determine a change in electrical capacitance due to presence or absence of an object within the electrical field. The proximity sensors 418(14) may be configured to provide sensor data indicative of one or more of a presence or absence of an object, a distance to the object, or characteristics of the object.

The sensors 418 may include other sensors 418(S) as well. For example, the other sensors 418(S) may include smart floors, light curtains, thermometers, barometric sensors, hygrometers, and so forth. For example, smart floors may utilize one or more of transmitters or receivers of electromagnetic signals 508 positioned in or beneath a floor 108 to determine one or more of location or identification of an object within the facility 402.

In some implementations, the camera 106 or other sensors 418(S) may include hardware processors, memory, and other elements configured to perform various functions. For example, the cameras 106 may be configured to generate image data 112, send the image data 112 to another device such as the server 504, and so forth.

The facility 402 may include one or more access points 510 configured to establish one or more wireless networks. The access points 510 may use Wi-Fi, NFC, Bluetooth, or other technologies to establish wireless communications between a device and the network 502. The wireless networks allow the devices to communicate with one or more of the sensors 418, the inventory management system 420, the tag 506, a communication device of the cart 416, or other devices.

Output devices 512 may also be provided in the facility 402. The output devices 512 are configured to generate signals 508, which may be perceived by the user 414 or detected by the sensors 418. In some implementations, the output devices 512 may be used to provide illumination of the optical sensor array 418(13).

Haptic output devices 512(1) are configured to provide a signal 508 that results in a tactile sensation to the user 414. The haptic output devices 512(1) may use one or more mechanisms such as electrical stimulation or mechanical displacement to provide the signal 508. For example, the haptic output devices 512(1) may be configured to generate a modulated electrical signal 508, which produces an apparent tactile sensation in one or more fingers of the user 414. In another example, the haptic output devices 512(1) may comprise piezoelectric or rotary motor devices configured to provide a vibration, which may be felt by the user 414.

One or more audio output devices 512(2) may be configured to provide acoustic output. The acoustic output includes one or more of infrasonic sound, audible sound, or ultrasonic sound. The audio output devices 512(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 512(3) may be configured to provide output, which may be seen by the user 414 or detected by a light-sensitive sensor 418 such as a camera 106 or an optical sensor 418(10). In some implementations, the display devices 512(3) may be configured to produce output in one or more of infrared, visible, or ultraviolet light. The output may be monochrome or in color. The display devices 512(3) may be one or more of emissive, reflective, microelectromechanical, and so forth. An emissive display device 512(3), such as using LEDs, is configured to emit light during operation. In comparison, a reflective display device 512(3), such as using an electrophoretic element, relies on ambient light to present an image. Backlights or front lights may be used to illuminate non-emissive display devices 512(3) to provide visibility of the output in conditions where the ambient light levels are low.

The display devices 512(3) may be located at various points within the facility 402. For example, the addressable displays 512(3) may be located on inventory locations 412, carts 416, on the floor 108 of the facility 402, and so forth.

Other output devices 512(P) may also be present. For example, the other output devices 512(P) may include scent/odor dispensers, document printers, 3D printers or fabrication equipment, and so forth.

Figure 6:
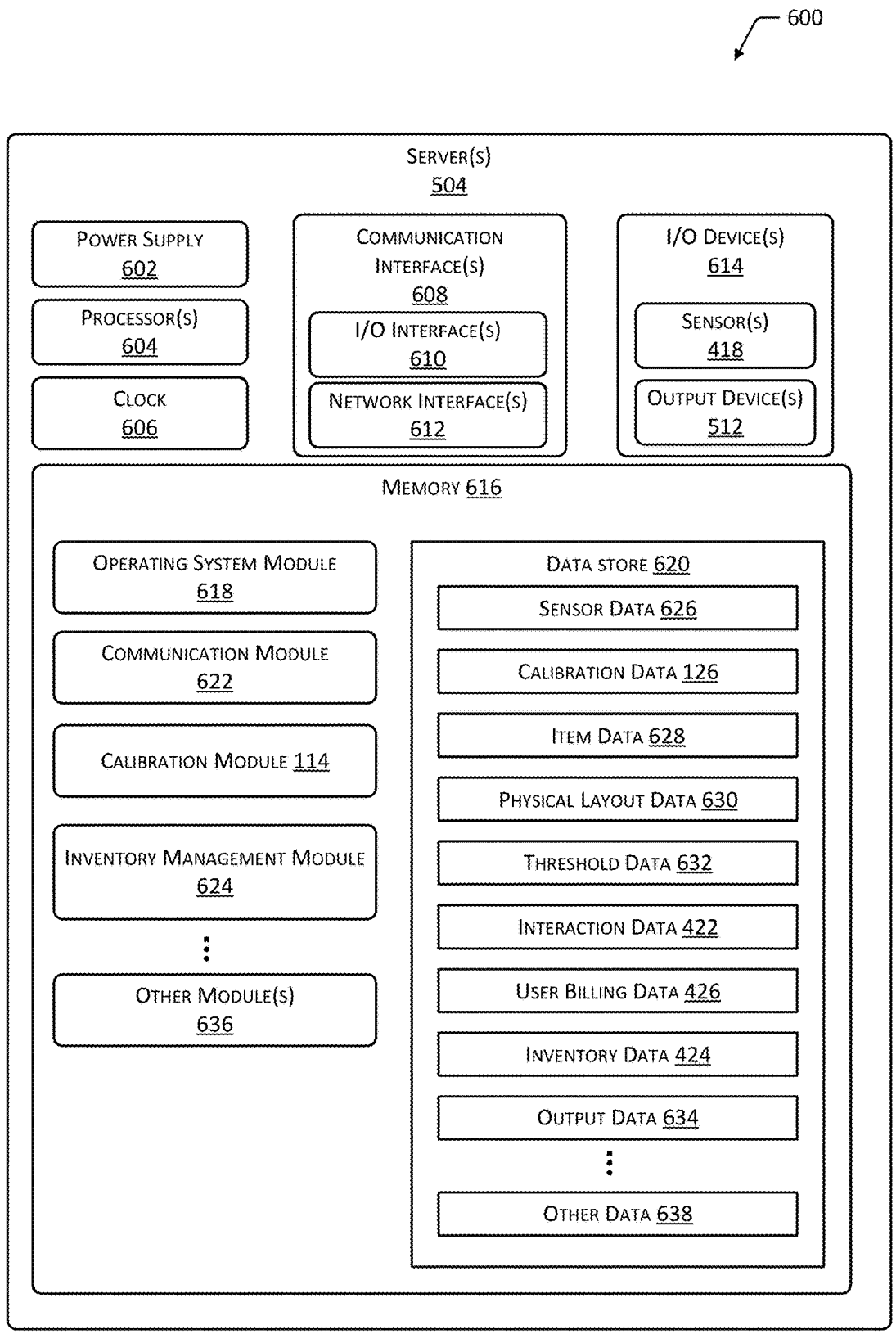
FIG. 6 is a block diagram of a server to support operation of the facility, according to some implementations.

FIG. 6 illustrates a block diagram 600 of a server 504 configured to support operation of the facility 402, according to some implementations. The server 504 may be physically present at the facility 402, may be accessible by the network 502, or a combination of both. The server 504 does not require end-user knowledge of the physical location and configuration of the system that delivers the services. Common expressions associated with the server 504 may include "on-demand computing", "software as a service (SaaS)", "platform computing", "network-accessible platform", "cloud services", "data centers", and so forth. Services provided by the server 504 may be distributed across one or more physical or virtual devices.

One or more power supplies 602 may be configured to provide electrical power suitable for operating the components in the server 504. The server 504 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The server 504 may include one or more communication interfaces 608 such as input/output (I/O) interfaces 610, network interfaces 612, and so forth. The communication interfaces 608 enable the server 504, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include input devices such as one or more of a sensor 418, keyboard, mouse, scanner, and so forth. The I/O devices 614 may also include output devices 512 such as one or more of a display device 512(3), printer, audio speakers, and so forth. In some embodiments, the I/O devices 614 may be physically incorporated with the server 504 or may be externally placed.

The network interfaces 612 may be configured to provide communications between the server 504 and other devices, such as the carts 416, routers, access points 510, and so forth. The network interfaces 612 may include devices configured to couple to personal area networks (PANS), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The server 504 may also include one or more busses or other internal communications hardware or software that allow for the transfer of data between the various modules and components of the server 504.

As shown in FIG. 6, the server 504 includes one or more memories 616. The memory 616 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 616 provides storage of computer-readable instructions, data structures, program modules, and other data for the operation of the server 504. A few example functional modules are shown stored in the memory 616, although the same functionality may alternatively be implemented in hardware, firmware, or as a system on a chip (SoC).

The memory 616 may include at least one operating system (OS) module 618. The OS module 618 is configured to manage hardware resource devices such as the I/O interfaces 610, the I/O devices 614, the communication interfaces 608, and provide various services to applications or modules executing on the processors 604. The OS module 618 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 616 may be a data store 620 and one or more of the following modules. These modules may be executed as foreground applications, background tasks, daemons, and so forth. The data store 620 may use a flat file, database, linked list, tree, executable code, script, or other data structure to store information. In some implementations, the data store 620 or a portion of the data store 620 may be distributed across one or more other devices including the servers 504, network attached storage devices, and so forth.

A communication module 622 may be configured to establish communications with one or more of the carts 416, sensors 418, display devices 512(3), other servers 504, or other devices. The communications may be authenticated, encrypted, and so forth.

The memory 616 may store the calibration module 114 that is configured to determine the calibration data 126 as described above.

The memory 616 may store an inventory management module 624. The inventory management module 624 is configured to provide the inventory functions as described herein with regard to the inventory management system 420. For example, the inventory management module 624 may determine the locations of items 104 as they move between different inventory locations 412, to and from the carts 416, determine where a return of an item 104 was made to a particular inventory location 412 designated for that type of item 104, and so forth. The inventory management module 624 may access sensor data 626 such as one or more of the weight sensor data or the other sensor data 626.

Information used by the inventory management module 624 may be stored in the data store 620. For example, the data store 620 may store the sensor data 626, item data 628, physical layout data 630, threshold data 632, interaction data 422, user billing data 426, inventory data 424, output data 634, and so forth.

The sensor data 626 comprises information acquired from one or more of the cameras 106 or other sensors 418. For example, the sensor data 626 may comprise the image data 112.

Processing of one or more of image data 112 or portions thereof, may be performed by implementing, at least in part, one or more of the following tools or techniques. In one implementation, processing of the image data 112 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the image data. In still another implementation, functions such as those in the Machine Vision Toolbox for Matlab (MVTB) available using MATLAB as developed by MathWorks, Inc. of Natick, Mass., USA, may be utilized.

Techniques such as artificial neural networks (ANNs), convolutional neural networks (CNN), active appearance models (AAMs), active shape models (ASMs), principal component analysis (PCA), cascade classifiers, and so forth, may also be used to process the other sensor data 626 or other data 638. For example, the ANN may be trained using a supervised learning algorithm such that object identifiers are associated with images of particular objects within training images provided to the ANN. Once trained, the ANN may be provided with the other sensor data 626 and the item data 628 to allow for a determination of similarity between the object represented in an image and the item 104 as described by the item data 628. For example, to determine identity of an object image data 112, a comparison may be made between the image data 112 and a sample image stored in the item data 628. If the comparison exceeds a threshold, the item 104 may be deemed identified.

The item data 628 provides information about the characteristics of a particular type of item 104. These characteristics may include weight of the item 104 individually or in aggregate. For example, the item data 628 may comprise information indicative of a weight of a single item 104, or a package, kit, or other grouping considered to be a single item 104. Other information such as weight distribution may also be stored.

The item data 628 may include data about other characteristics, such as information about appearance for use in machine vision or manual recognition. For example, the item data 628 may include sample images of the type of item 104, three-dimensional point cloud data for the item 104, and so forth. The sample image data may comprise one or more images of one or more of that type of item 104. For example, sample image data may be obtained during processing or intake of the item 104 to be used by the facility 402.

The item data 628 may include other information about the appearance. For example, a plurality of local descriptor values may be generated by feature extraction algorithms, parameters for classifiers, neural network configuration data, and so forth, that characterizes the appearance of a representative of one or more of the item 104.

The item data 628 may include one or more geometry data. The geometry data may include information indicative of size and shape of the item 104 in one, two, or three dimensions. For example, the geometry data may include the overall shape of an item 104, such as a cuboid, sphere, cylinder, and so forth. The geometry data may also include information such as length, width, depth, and so forth, of the item 104. Dimensional information in the geometry data may be measured in pixels, centimeters, inches, arbitrary units, and so forth. The geometry data may be for a single item 104, or a package, kit, or other grouping considered to be a single item 104.

The item data 628 may include an item identifier. The item identifier may be used to distinguish one type of item 104 from another. For example, the item identifier may include a stock keeping unit (SKU) string, Universal Product Code (UPC) number, and so forth. The items 104 that are of the same type may be referred to by the same item identifier. For example, cans of beef flavor Brand X dog food may be represented by the item identifier value of "9811901181". In other implementations, non-fungible items 104 may each be provided with a unique item identifier, allowing each to be distinguished from one another.

The item data 628 may indicate the types and quantities of items 104 that are expected to be stored at that particular inventory location 412 such as in a particular lane on a shelf 102. The item data 628 may include one or more inventory location identifiers (IDs). The inventory location ID is indicative of a particular area or volume of an inventory location 412 such as a shelf 102 that is designated for stowage of the type of item 104. For example, a single shelf 102 may have several lanes, each with a different inventory location ID. Each of the different inventory location IDs may be associated with a lane having a particular area on the shelf 102 designated for storage of a particular type of item 104. A single type of item 104 may be associated with a particular inventory location ID, a plurality of inventory location IDs may be associated with the single type of item 104, more than one type of item 104 may be associated with the particular inventory location ID, and so forth.

The inventory management module 624 may utilize physical layout data 630 during operation. For example, the physical layout data 630 may comprise information representative of a map or floor plan of the facility 402 with relative positions of inventory locations 412, locations of cameras 106 based on the calibration data 126, locations of weight sensors 418(5), data indicative of how items 104 are to be arranged at the inventory locations 412, and so forth.

The physical layout data 630 may associate a particular inventory location identifier (ID) with other information such as physical layout data 630, sensor position data, sensor direction data, sensor identifiers, and so forth. The physical layout data 630 provides information about where in the facility objects are, such as the inventory location 412, the sensors 418, and so forth. In some implementations, the physical layout data 630 may be relative to another object.

The inventory management module 624 may process the sensor data 626 and generate output data 634. For example, the calibration data 126 may be used to process the image data 112 from the plurality of cameras 106, or at least a subset thereof, to determine a location of an object such as an item 104, user 414, cart 416, and so forth.

The threshold data 632 may comprise one or more thresholds. For example, the threshold data 632 may specify a maximum distance in vector space, threshold value, and so forth used by the cluster module 122 to determine if two images depict the same feature 120.

In some implementations the inventory management module 624 may generate output data 634, such as a restocking order. In another example, the output data 634 may comprise a dispatch order for an attendant to restock an inventory location 412.

As described above, the interaction data 422 may provide information about an interaction, such as a pick of an item 104 from the inventory location 412, a place of an item 104 to the inventory location 412, and so forth. For example, the image data 112 may comprise video that is processed to determine if an item 104 was picked or placed from an inventory location 412. The interaction data 422 may be used to generate the inventory data 424.

The inventory data 424 may comprise information indicative of quantity of an item 104. The quantity may comprise a count or value indicative of a number of items 104. The count may be a measured or an estimated value. The quantity may be associated with a particular inventory location ID, for an entire facility, and so forth. For example, the same type of item 104 may be stored at different shelves 102 within the facility 402. The inventory data 424 may indicate the quantity on hand for each of the different inventory locations 412.

The inventory management module 624 may utilize data in the data store 620 during operation. For example, the physical layout data 630 and the sensor data 626 acquired by the cameras 106 may be used to determine a location of a user 414 in the facility 402 at different times.

Other modules 636 may also be present in the memory 616 as well as other data 638 in the data store 620. For example, the other modules 636 may include a restocking module that generates orders for items 104 responsive to quantity indicated by the inventory data 424.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a plurality of cameras in a material handling facility;
   a memory storing first computer-executable instructions; and
   a hardware processor to execute the first computer-executable instructions to:
   receive a plurality of images acquired by the plurality of cameras;
   determine a plurality of features that are present the plurality of images, wherein each feature is representative of a three-dimensional (3D) point in the material handling facility as depicted in one of the plurality of images;
   determine, based on the plurality of features, a plurality of clusters wherein each cluster is a group of images from the plurality of images that depicts the same feature;
   determine a subset of the plurality of cameras that are associated with the each of the cluster;
   determine, for the each cluster, a triangulation matrix representative of a first translation and first rotation of each camera in the subset of the plurality of cameras associated with the each cluster;
   determine, by adjusting the first translation and the first rotation of the each camera, a second rotation and second translation for each of the plurality of cameras, wherein the second rotation and the second translation minimize a sum of:
   a minimum of a triangulation cost using the triangulation matrix for the each cluster; and
   a minimum of a back-projection error for each cluster.

2. The system of claim 1, the first computer-executable instructions to determine the triangulation matrix comprising instructions to:
   determine a homogenous linear system comprising a plurality of projections of the same feature with respect to the each of the plurality of cameras that are associated with the each cluster; and
   determine a minimum eigenvalue and a minimum eigenvector of the homogenous linear system.

3. The system of claim 1, the first computer-executable instructions to determine the triangulation cost comprising instructions to:
   determine a minimum eigenvalue for each of the triangulation matrices; and
   determine a sum of the minimum eigenvalues.

4. The system of claim 1, the first computer-executable instructions to determine the back-projection error comprising instructions to:
   determine, for each feature in the each cluster, a distance on a normalized plane with respect to the each camera between the each feature on the normalized plane and a projection of the each feature onto the normalized plane.

5. A method comprising:
   acquiring a plurality of images, wherein each image is acquired by one of a plurality of cameras;
   determining a plurality of features that are present in each of the plurality of images, wherein each feature in the plurality of features is representative of a three-dimensional (3D) point in an environment;
   determining a plurality of clusters, wherein each cluster comprises a subset of the images that are associated with a particular 3D point as indicated by at least a portion of the plurality of features;
   determining, for the each cluster, a subset of the plurality of cameras that obtained the images in the subset of the images;
   determining, for the each cluster, a triangulation matrix representative of a first translation and first rotation of each camera in the subset of the plurality of cameras associated with the each cluster; and
   determining calibration data indicative of a second rotation and second translation for each of the plurality of cameras.

6. The method of claim 5, the determining the plurality of features comprising:
   processing the each image in the plurality of images with a scale-invariant feature transform (SIFT) algorithm.

7. The method of claim 5, wherein the plurality of features are not known prior to the determining the plurality of features.

8. The method of claim 5, the determining the plurality of clusters comprising:
   determining a first feature value in a first image;
   determining a second feature value in a second image; and
   determining a difference between the first feature value and the second feature value is less than a threshold value.

9. The method of claim 5, wherein the each cluster contains less than a threshold number of features representing a 3D point other than the particular 3D point.

10. The method of claim 5, wherein the each camera acquires at least one image that includes at least a portion of the plurality of features.

11. The method of claim 5, wherein a first subset of the plurality of cameras acquire images of a first portion of the environment and a second subset of the plurality of cameras acquire images of a second portion of the environment, wherein the first portion of the environment is different from the second portion of the environment.

12. The method of claim 5, further comprising:
   determining a minimum eigenvalue for each of the triangulation matrices;
   determining a sum of the minimum eigenvalues for the each of the triangulation matrices; and the determining the calibration data comprises determining the second rotation and the second translation for the each of the plurality of cameras that results in a minimum sum of:
  a minimum of the sum of the minimum eigenvalues for the each cluster; and
  a minimum back-projection error for the each cluster.

13. The method of claim 5, further comprising:
determining a first camera of the plurality of cameras; and
wherein the second rotation and the second translation for the each of the plurality of cameras is designated with respect to one or more axes of the first camera.

14. The method of claim 5, the determining the triangulation matrix comprising:
  determining, for the each cluster, a homogenous linear system comprising a plurality of projections of a particular feature with respect to each camera of the subset of the plurality of cameras that are associated with the each cluster; and
  determining a minimum eigenvalue and a minimum eigenvector of the homogenous linear system.

15. A system comprising:
a plurality of cameras in an environment;
a memory storing first computer-executable instructions; and
a hardware processor to execute the first computer-executable instructions to:
  acquire a plurality of images, wherein each image is acquired by one of the plurality of cameras;
  determine a plurality of features that are present in each of at least a portion of the plurality of images, wherein at least a portion of the features are representative of three-dimensional (3D) points in the environment;
  determine, based on the plurality of features, a plurality of clusters wherein each cluster comprises a subset of the plurality of images that are associated with a particular 3D point as indicated by at least a portion of the plurality of features;
  determine a subset of the plurality of cameras that are associated with the each cluster;
  determine, for the each cluster, a triangulation matrix representative of a first translation and first rotation of each camera in the subset of the plurality of cameras associated with the each cluster; and
  determine calibration data indicative of a second rotation and second translation for each of the plurality of cameras.

16. The system of claim 15, the first computer-executable instructions to determine the triangulation matrix comprising instructions to:
  determine a homogenous linear system comprising a plurality of projections of a feature with respect to the each of the plurality of cameras that are associated with the each cluster; and
  determine a minimum eigenvalue and a minimum eigenvector of the homogenous linear system.

17. The system of claim 15, the first computer-executable instructions to determine a triangulation cost comprising instructions to:
  determine a minimum eigenvalue for each of the triangulation matrices; and
  determine a sum of the minimum eigenvalues.

18. The system of claim 15, the first computer-executable instructions to determine a back-projection error comprising instructions to:
  determine, for each feature in the each cluster, a distance on a normalized plane with respect to a camera between the each feature on the normalized plane and a projection of the each feature onto the normalized plane.

19. The system of claim 15, the first computer-executable instructions to determine the plurality of clusters comprising instructions to:
  determine a first feature value in a first image;
  determine a second feature value in a second image; and
  determine a difference between the first feature value and the second feature value is less than a threshold value.

20. The system of claim 15, wherein:
a first subset of the plurality of cameras acquire images of a first portion of the environment, and
a second subset of the plurality of cameras acquire images of a second portion of the environment, wherein the first portion of the environment is different from the second portion of the environment.

* * * * *

UNITED STATES PATENT AND TRADEMARK OFFICE
CERTIFICATE OF CORRECTION

PATENT NO.         : 10,706,587 B1
APPLICATION NO.    : 16/141814
DATED              : July 7, 2020
INVENTOR(S)        : Lorenzo Sorgi et al.

It is certified that error appears in the above-identified patent and that said Letters Patent is hereby corrected as shown below:

In the Claims

Column 29, Claim 1, Line 45:
Currently reads: "associated with the each of the cluster;".
Where it should read: --associated with the each cluster;--.

Column 29, Claim 1, Line 35-36:
Currently reads: "determine a plurality of features that are present the plurality of images".
Where it should read: --determine a plurality of features that are present in the plurality of images--.

Signed and Sealed this
First Day of September, 2020

Andrei Iancu
*Director of the United States Patent and Trademark Office*